US012656742B2

(12) United States Patent
Cho et al.

(10) Patent No.: US 12,656,742 B2
(45) Date of Patent: Jun. 16, 2026

(54) ELECTRONIC DEVICE INCLUDING BODY-CONTACTABLE ELECTRODE

(71) Applicant: SAMSUNG ELECTRONICS CO., LTD., Suwon-si (KR)

(72) Inventors: Chungki Cho, Suwon-si (KR); Wonik Do, Suwon-si (KR); Jonggwan Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 380 days.

(21) Appl. No.: 18/224,870

(22) Filed: Jul. 21, 2023

(65) Prior Publication Data

US 2023/0359152 A1 Nov. 9, 2023

Related U.S. Application Data

(63) Continuation of application No. PCT/KR2021/020130, filed on Dec. 29, 2021.

(30) Foreign Application Priority Data

Jan. 25, 2021 (KR) ........................ 10-2021-0010152

(51) Int. Cl.
*G04G 21/02* (2010.01)
*G04G 9/00* (2006.01)
(Continued)

(52) U.S. Cl.
CPC ........... *G04G 21/02* (2013.01); *G04G 9/0064* (2013.01); *G04G 17/00* (2013.01); *G04G 99/00* (2013.01)

(58) Field of Classification Search
None
See application file for complete search history.

(56) References Cited

U.S. PATENT DOCUMENTS

| | | | |
|---|---|---|---|
| 9,591,121 B2 | 3/2017 | Jung et al. | |
| 9,823,746 B2 | 11/2017 | Kim et al. | |

(Continued)

FOREIGN PATENT DOCUMENTS

| | | | | |
|---|---|---|---|---|
| CN | 104865820 A | 8/2015 | | |
| GB | 2037025 A * | 7/1980 | ............. | G04G 21/08 |

(Continued)

OTHER PUBLICATIONS

Espacenet combined translation of JP 2006293814 (Year: 2025).*

(Continued)

*Primary Examiner* — Regis J Betsch
*Assistant Examiner* — Michael James Walker
(74) *Attorney, Agent, or Firm* — Sughrue Mion, PLLC

(57) ABSTRACT

An electronic device includes a main body; a display; an electrode positioned in the main body to be in contact with a body of a user; and a processor operatively connected to the display and the electrode, wherein the processor is configured to: identify an electrical value measured through the electrode, determine whether to control a performance of the electronic device by comparing the electrical value and a preconfigured control-requiring value, identify whether the electrical value is within at least one of a first range and a second range which are classified and configured in advance, based on identifying that the electrical value is within the first range, control the performance of the electronic device to a first level, and based on identifying that the electrical value is within the second range, control the performance of the electronic device to a second level, and wherein the performance of the electronic device controlled to the second level is relatively lower than the performance of the electronic device controlled to the first level.

18 Claims, 17 Drawing Sheets

(51) Int. Cl.

| | |
|---|---|
| ***G04G 17/00*** | (2013.01) |
| ***G04G 99/00*** | (2010.01) |

(56) References Cited

U.S. PATENT DOCUMENTS

| | | | | |
|---|---|---|---|---|
| 9,854,983 | B2 | 1/2018 | Minami et al. | |
| 10,551,889 | B2 | 2/2020 | Ashwood et al. | |
| 10,852,772 | B2 | 12/2020 | Fukuma et al. | |
| 2012/0271121 | A1 | 10/2012 | Della Torre et al. | |
| 2016/0062326 | A1 | 3/2016 | Bang et al. | |
| 2016/0209875 | A1 | 7/2016 | Kim | |
| 2017/0164476 | A1 | 6/2017 | Shibuya | |
| 2018/0263501 | A1* | 9/2018 | Shim | A61B 5/01 |
| 2020/0138377 | A1 | 5/2020 | Huijbregts et al. | |
| 2020/0367176 | A1* | 11/2020 | Lee | G06F 1/3287 |
| 2021/0240165 | A1 | 8/2021 | Noh et al. | |

FOREIGN PATENT DOCUMENTS

| | | | | | |
|---|---|---|---|---|---|
| JP | 2006293814 | A | * | 10/2006 | |
| JP | 2020-60872 | A | | 4/2020 | |
| KR | 10-2016-0085640 | A | | 7/2016 | |
| KR | 10-2017-0008996 | A | | 1/2017 | |
| KR | 10-2017-0038244 | A | | 4/2017 | |
| KR | 10-1738673 | B1 | | 5/2017 | |
| KR | 10-2017-0068252 | A | | 6/2017 | |
| KR | 20190127306 | A | * | 11/2019 | H04M 1/72569 |
| KR | 10-2020-0132161 | A | | 11/2020 | |
| KR | 10-2021-0029487 | A | | 3/2021 | |
| WO | WO-2019212156 | A1 | * | 11/2019 | H04M 1/72454 |

OTHER PUBLICATIONS

KIPRIS combined translation of KR 20170068252 (Year: 2025).*

Espacenet combined translation of WO 2019212156 (Year: 2025).*

Extended European Search Report dated Apr. 30, 2024, issued by the European Patent Office in European Application No. 21921500.1.

International Search Report (PCT/ISA/210) issued by the International Searching Authority on Apr. 11, 2022 in International Patent Application No. PCT/KR2021/020130.

Written Opinion (PCT/ISA/237) issued by the International Searching Authority on Apr. 11, 2022 in International Patent Application No. PCT/KR2021/020130.

Communication dated Sep. 16, 2025 issued by the Korean Intellectual Property Office in Korean Patent Application No. 10-2021-0010152.

* cited by examiner

FIG. 9

| PAM MAX Power limitation | | | |
|---|---|---|---|
| STATE CHANGE | ELAPSE TIME (hour) | | |
| | 2 | 4 | 6 |
| NORMAL STATE | 0 | 0 | 0 |
| FIRST RANGE | -2.5 | -5 | -7 |
| SECOND RANGE | -5 | -7 | |
| THIRD RANGE | -7 | | |

| | |
|---|---|
| FIRST LEVEL PERFORMANCE LIMITATION | -2.5 dBm |
| SECOND LEVEL PERFORMANCE LIMITATION | -5 dBm |
| THIRD LEVEL PERFORMANCE LIMITATION | -7 dBm |

FIG. 14

| STATE CHANGE | ELAPSE TIME (hour) | | |
|---|---|---|---|
| | 2 | 4 | 6 |
| GENERAL STATE | 0 | 0 | 0 |
| FIRST RANGE | T1 | T2 | T3 |
| SECOND RANGE | T2 | T3 | - |
| THIRD RANGE | T3 | - | - |

| | |
|---|---|
| PRECONFIGURED REFERENCE TEMPERATURE | R |
| FIRST REFERENCE TEMPERATURE | T1 |
| SECOND REFERENCE TEMPERATURE | T2 |
| THIRD REFERENCE TEMPERATURE | T3 |

ELECTRONIC DEVICE INCLUDING BODY-CONTACTABLE ELECTRODE

This application is by-pass continuation application of International Application No. PCT/KR2021/020130, filed on Dec. 29, 2021, which based on and claims priority to Korean Patent Application No. 10-2021-0010152, filed on Jan. 25, 2021, in the Korean Intellectual Property Office, the disclosures of which are incorporated by reference herein in their entireties.

BACKGROUND

1. Field

The disclosure relates to an electronic device capable of controlling performance of an electronic device by using a body-contactable electrode.

2. Description of Related Art

An electronic device may generate heat when operating. Excessive heat caused by the operation may damage the electronic device and in case of an electronic device coming in contact with a user's body, the electronic device may injure the user's body, and thus heat needs to be controlled.

For example, a heating control operation that limits the maximum performance of electronic components included in the electronic device is widely used. The heating control operation of the electronic device is generally considered to prevent damage to the electronic device.

The emergence of an electronic device having a form wearable on a human body may cause injury to the human body with heating of the electronic device.

Generally, burns are caused by direct or indirect contact of the human body with a hot object. Low-temperature burns refer to thermal injury to the human body that occurs due to a prolonged exposure to low level heat.

An electronic device wearable on the human body may be in constant contact with the human body at a fixed position. Low-temperature burns may occur due to low level heat caused by the electrical device.

Furthermore, a foreign substance such as moisture between the electronic device and the skin may be a major contributor to low-temperature burns by more easily transferring heat to the skin. An electronic device in close contact with the human body of a user may cause low-temperature burns by preventing heat from dissipating.

BACKGROUND

Provided is an electronic device capable of preventing the low-temperature burns.

In addition, provided is an electronic device that may identify moisture existing between the human body and the electronic device by using a body-contactable electrode. The electronic device of the disclosure may configure a voltage (current) value (or range) for heating control through the identified information and control performances of the electronic device based on the configured information. Furthermore, a user interface related to performance control of the electronic device may be provided.

In addition, provided is a method for predicting a degree to which heat of the electronic device is transferred to the human body by using a body-contactable electrode and adaptively controlling a temperature based on the predicted information.

According to an aspect of the disclosure, an electronic device includes: a main body; a display; an electrode positioned in the main body to be in contact with a body of a user; and a processor operatively connected to the display and the electrode, wherein the processor is configured to: identify an electrical value measured through the electrode, determine whether to control a performance of the electronic device by comparing the electrical value and a preconfigured control-requiring value, identify whether the electrical value is within at least one of a first range and a second range which are classified and configured in advance, based on identifying that the electrical value is within the first range, control the performance of the electronic device to a first level, and based on identifying that the electrical value is within the second range, control the performance of the electronic device to a second level, and wherein the performance of the electronic device controlled to the second level is relatively lower than the performance of the electronic device controlled to the first level.

The processor may be further configured to: detect whether the electronic device is worn by the user; based on detecting the electronic device is worn, obtain a reference value based on a measurement through the electrode; and configure the control-requiring value based on the reference value.

The reference value is obtained further based on determining that the electronic device is worn and is in a fully charged state.

The performance at both the first level and the second level may include at least one of: controlling an operation clock of the processor, controlling an output of a communication module included in the electronic device, and controlling a measurement period of a sensor module included in the electronic device.

The electrical value may include a current value and a voltage value for identifying a change in a contact resistance between the electrode and the body of the user due to a foreign substance introduced between the electrode and the body of the user.

The processor may be further configured to: re-identify the electrical value measured through the electrode after controlling the performance of the electronic device to the first level or the second level; compare the re-identified electrical value and the control-requiring value for a preconfigured time; and control, based on a result of the comparison, the display to display a warning interface.

The processor may be further configured to: re-identify the electrical value measured through the electrode after controlling the performance of the electronic device to the first level; compare the re-identified electrical value and the control-requiring value for a preconfigured time; and control, based on a result of the comparison, the performance of the electronic device to the second level.

The processor may be further configured to: control the display to display an identification interface indicating whether the performance controlled; and determine whether to control the performance of the electronic device based on identifying a comparison result between the electrical value and the preconfigured control-requiring value, and an input through the identification interface.

The processor may be further configured to reconfigure the pre-configured control-requiring value based on a rejection of a control of the performance being determined to be input through the identification interface more than a preconfigured number of times.

According to an aspect of the disclosure, a heating control method of an electronic device, includes: determining, by a processor of the electronic device, whether to control a performance of the electronic device based on a temperature of the electronic device measured by a temperature sensor of the electronic device reaching a preconfigured reference temperature; identifying, by the processor, an electrical value measured through an electrode included in the electronic device; comparing, by the processor, the electrical value and a preconfigured control-requiring value; and changing, by the processor, the preconfigured reference temperature to a lower temperature, based on a result of the comparing.

The identifying the electrical value may include, based on determining the temperature of the electronic device measured through the temperature sensor as reaching a preconfigured monitoring temperature, identifying the electrical value as a measurement through the electrode.

The changing the preconfigured reference temperature may include: identifying whether the electrical value is within at least one of a first range and a second range which are classified and configured in advance; based on identifying that the electrical value is within the first range, changing the preconfigured reference temperature to a first reference temperature; and based on identifying that the electrical value is within the second range, changing the preconfigured reference temperature to a second reference temperature, and wherein the second reference temperature is a lower temperature than the first reference temperature.

The method may further include: detecting, by the processor, whether the electronic device is worn by a user; based on detecting that the electronic device is worn by the user, obtain a reference value measured through the electrode; and configuring, by the processor, the control-requiring value based on the reference value.

The method may further include: identifying, by the processor, a re-identified electrical value by re-identifying the electrical value measured through the electrode after changing the preconfigured reference temperature to a first reference temperature; comparing, by the processor, the re-identified electrical value and the control-requiring value for a preconfigured time; and changing, by the processor, the preconfigured reference temperature to a second reference temperature.

The method may further include: controlling, by the processor, the display to display an identification interface indicating whether the preconfigured reference temperature is changed; and determining whether the preconfigured reference temperature is to be changed based on identifying a comparison result between the electrical value and the preconfigured control-requiring value, and an input through the identification interface.

According to one or more embodiments of the disclosure, an electronic device may prevent a low-temperature burn by detecting a foreign substance between the electronic device and the skin to predict a situation in which low-temperature burns may occur at a temperature lower than normal and controlling heating of the electronic device.

Furthermore, according to one or more embodiments, by controlling performance of the electronic device to an appropriate level in consideration of a decrease in usability due to the performance limitation of the electronic device, user inconvenience caused by the performance limitation may be resolved to a certain extent.

In addition, various effects directly or indirectly identified through the disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is tables illustrating one of performance control methods of an electronic device according to various embodiments of the disclosure;

FIG. 14 is tables illustrating one of performance control methods of an electronic device according to various embodiments of the disclosure.

In connection with the description of the drawings, like or similar reference numerals may be used for like or similar elements.

DETAILED DESCRIPTION

Figure 1:
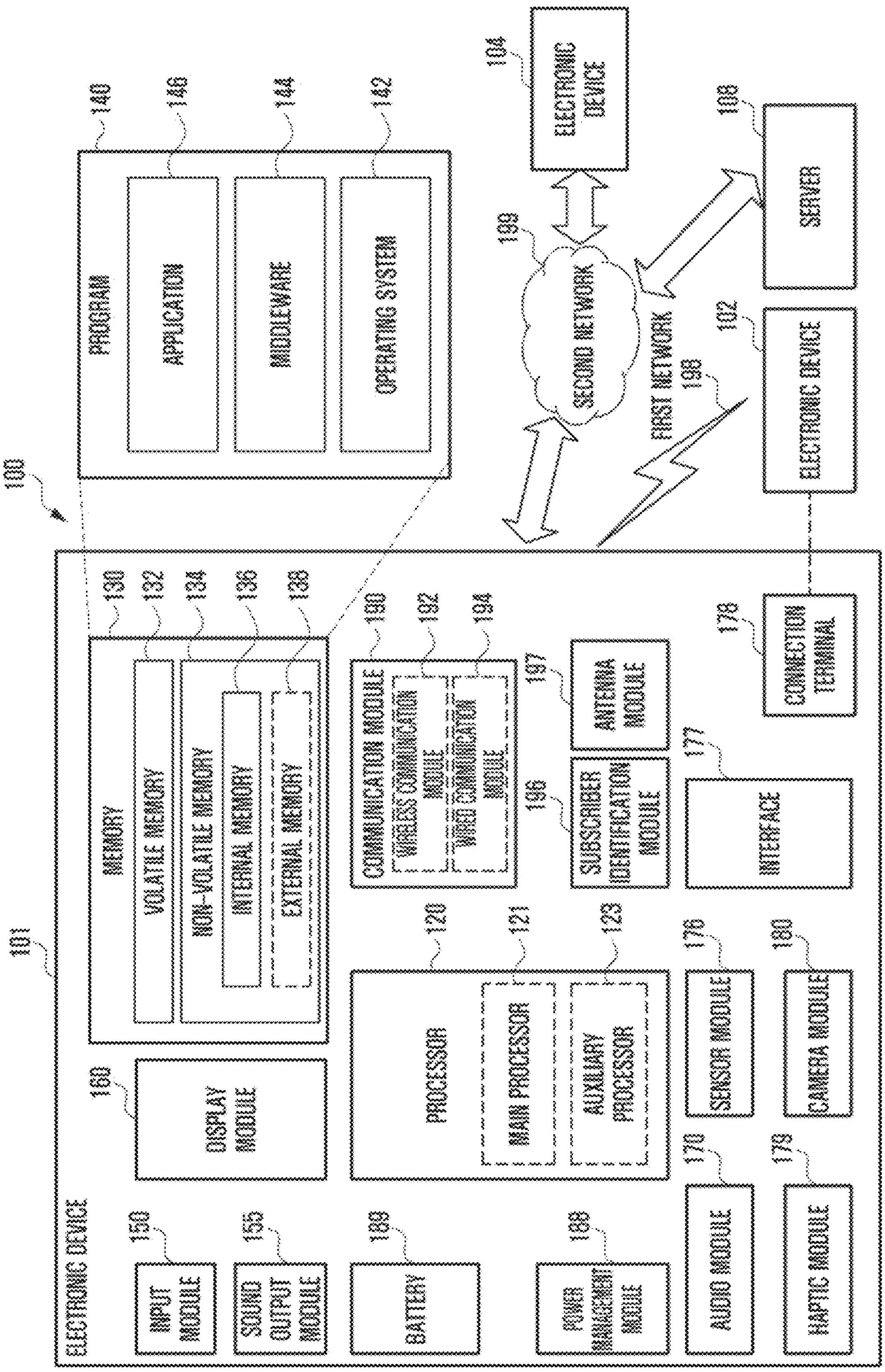
FIG. 1 is a block diagram illustrating an electronic device in a network environment according to various embodiments.

FIG. 1 is a block diagram illustrating an electronic device in a network environment according to various embodiments. Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
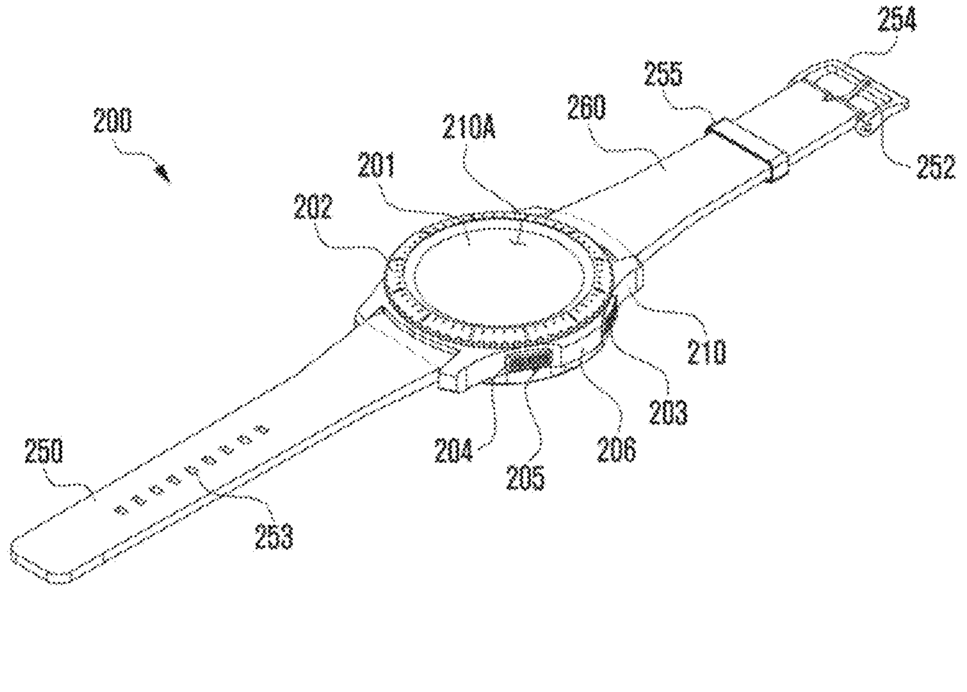
FIG. 2 is a front perspective view of an electronic device according to various embodiments of the disclosure.
Figure 3:
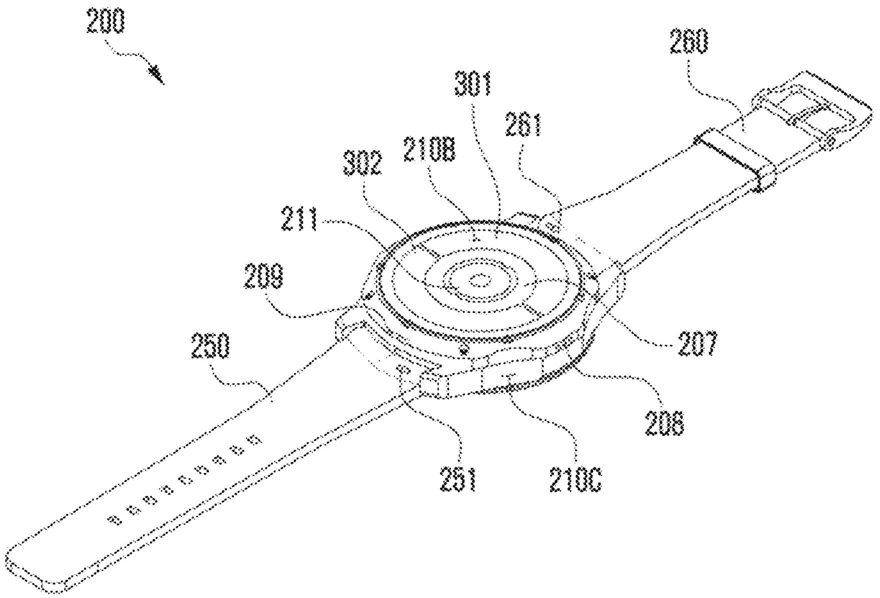
FIG. 3 is a rear perspective view of the electronic device of FIG. 2.
Figure 4:
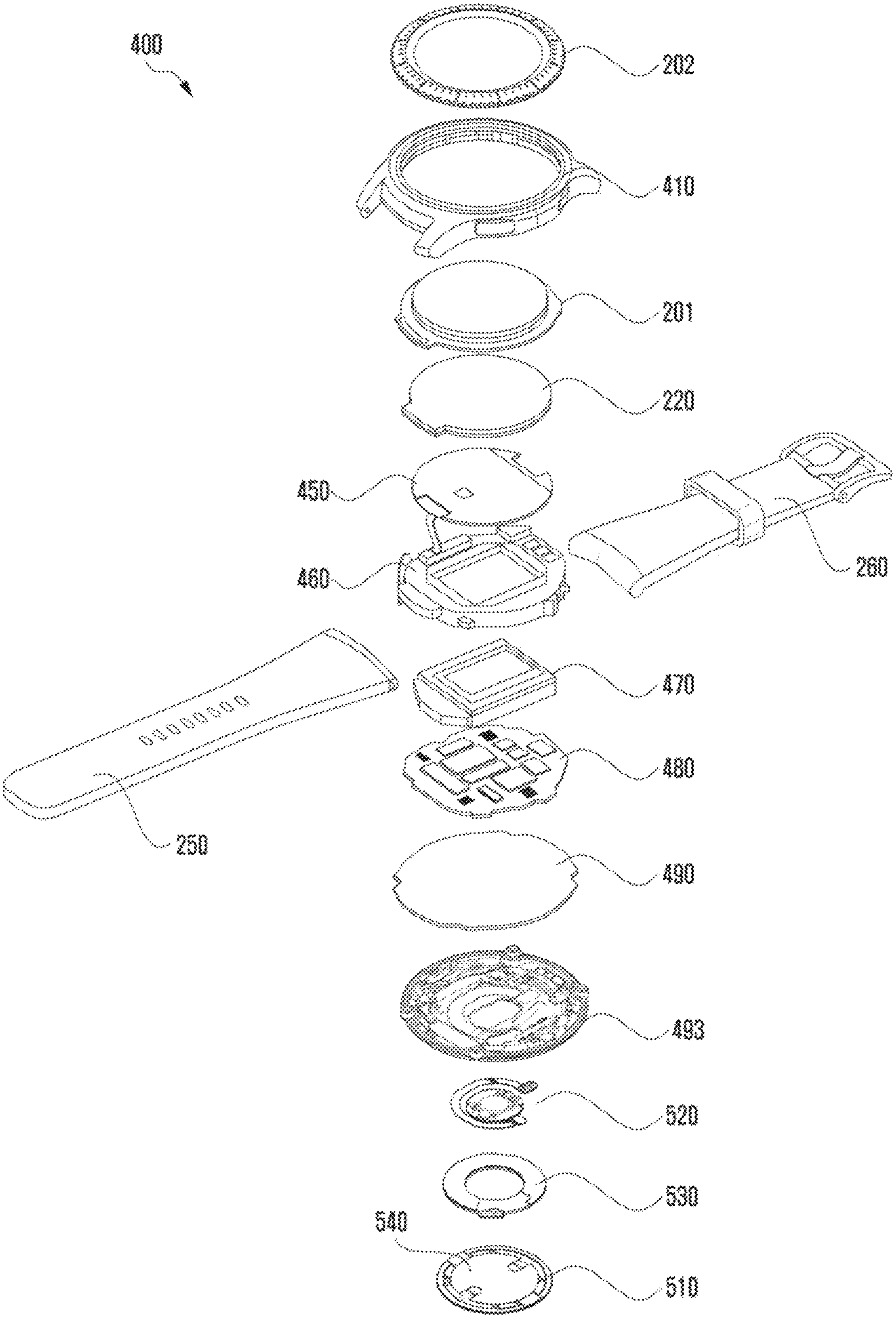
FIG. 4 is an exploded perspective view of the electronic device of FIG. 2.

FIG. 2 is a front perspective view of an electronic device 200 according to various embodiments disclosed herein. FIG. 3 is a rear perspective view of the electronic device 200 of FIG. 2. FIG. 4 is an exploded perspective view of the electronic device 200 of FIG. 2.

The electronic device 200 illustrated in FIG. 2, FIG. 3, and FIG. 4 may correspond to the electronic device 101 described in FIG. 1. Accordingly, even if not mentioned below, the electronic device 200 may include components described in FIG. 1.

Referring to FIG. 2 and FIG. 3, an electronic device 200 (e.g., the electronic device 101 of FIG. 1) according to one embodiment may include: a housing 210 including a first surface 210A (or front surface), a second surface 210B (or rear surface), and a side surface 210C surrounding a space between the first surface 210A and the second surface 210B, and binding members 250 and 260 each connected to at least a portion of the housing 210 and configured to allow the electronic device 200 to be detachably bound to a part of a user's body (e.g., wrist, ankle, etc.). In an embodiment, a structure configuring a portion of the first surface 210A, the second surface 210B, and the side surfaces 210C, which are shown in FIG. 2, may be referred to as a housing. According to an embodiment, the first surface 210A may be formed by a front plate 201 (e.g., a polymer plate or a glass plate including various coating layers) having at least a portion which is substantially transparent. The second surface 210B may be formed by a rear plate 207 which is substantially opaque. The rear plate 207 is formed by, for example, coated or colored glass, a ceramic, a polymer, a metal (e.g., aluminum, stainless steel (STS), or magnesium), or a combination of at least two thereof. The side surface 210C may be formed by a side bezel structure 206 (or "side surface member") that is coupled to the front plate 201 and the rear plate 207 and includes a metal and/or a polymer. In an embodiment, the rear plate 207 and the side bezel structure 206 may be integrally formed and include the same material (e.g., a metal material such as aluminum). The binding member 250 and binding member 260 may include various materials and shapes. The binding member 250 and binding member 260 may be formed as an integral unit link and a plurality of unit links by fabric, leather, rubber, urethane, a metal, a ceramic, or a combination of at least two thereof such that the same can move with regard to each other.

According to one embodiment, the electronic device 200 may include at least one of a display 220 (see FIG. 4), audio module 205 and audio module 208, a sensor module 211, key input device 202, key input device 203 and key input device 204, and a connector hole 209. According to an embodiment, at least one of the elements (e.g., the key input device 202, the key input device 203, and the key input device 204, the connector hole 209, or the sensor module 211) may be omitted from the electronic device 200 or another element may be further added to the electronic device 200.

In an embodiment, the display 220 may be exposed through a substantial portion of the front plate 201. The shape of the display 220 may be a shape corresponding to the shape of the front plate 201 and may have various shapes, such as a circle, an oval, or a polygon. The display 220 may be connected to or disposed adjacent to a touch sensing circuit, a pressure sensor capable of measuring the intensity (pressure) of a touch, and/or a fingerprint sensor.

In an embodiment, the audio module 205 and audio module 208 may include a microphone hole 205 and a speaker hole 208. A microphone for acquiring external sound may be disposed inside the microphone hole 205, and in an embodiment, a plurality of microphones may be arranged inside thereof so as to sense the direction of sound. The speaker hole 208 may be used as an external speaker and a call receiver. In an embodiment, the speaker hole 208 and the microphone hole 205 may be implemented by one hole, or a speaker may be provided without the speaker hole 208 (e.g., piezo speaker).

In an embodiment, the sensor module 211 may generate an electrical signal or a data value corresponding to an internal operating state or an external environmental state of the electronic device 200. The sensor module 211 may include, for example, a biometric sensor module 211 (e.g., HRM sensor) disposed on the second surface 210B of the housing 210. The electronic device 200 may further include a sensor module, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

In an embodiment, the sensor module 211 may include any of an electrode (or electrode area) 301 and electrode 302 and a bio-signal detection circuit electrically connected to the any of the electrode 301 and electrode 302. For example, the any of the electrode 301 and electrode 302 may include a first electrode 301 and a second electrode 302 arranged on the second surface 210B of the housing 210. The sensor module 211 may be configured so that the any of the electrode 301 and electrode 302 acquires an electrical signal from a portion of the human body of a user and the bio-signal detection circuit detects biometric information of the user based on the electrical signal.

In an embodiment, the electronic device 200 may include multiple electrodes that may come into contact with the user's body. The multiple electrodes may include, for example, electrodes 301 and 302 disposed on the second surface 210B and an electrode disposed on the first surface 210A and/or a lateral surface 210C of the electronic device as shown in FIG. 3. The multiple electrodes may be connected to each other in a circuit manner and portions functioning as electrodes may be segmented from each other. For example, the electrode may include three electrodes including the electrode 301 and electrode 302 disposed on the second surface 210B and the electrode disposed on the lateral surface 210C. Various biometric information of the user may be detected through the multiple electrodes. In an embodiment, information on a user's electrocardiogram may be measured by using the multiple electrodes. The electrocardiogram measurement may be performed in various ways. For example, the multiple electrodes for the electrocardiogram measurement may include an INP (positive) electrode (e.g., the electrode 301), an INN (negative) electrode, a right-leg drive (RLD) electrode (e.g., the electrode 302). The electrocardiogram measurement may be performed through the INP electrode and the RLD electrode. Here, the RLD electrode may correspond to a connection point used to improve electrocardiogram measurement by reducing signals having the same phase in an electrode in contact with the human body.

In an embodiment, the key input device 202, the key input device 203, and the key input device 204 may include a wheel key 202 which is disposed on the first surface 210A of the housing 210 and is rotatable in at least one direction, and/or a side key button 203 and 204 disposed on the side surface 210C of the housing 210. The wheel key may have a shape corresponding to the shape of the front plate 201. In another embodiment, the electronic device 200 may not include some or all of the above-mentioned key input device 202, the key input device 203, and the key input device 204, and the key input device 202, the key input device 203, and the key input device 204 which are not included may be implemented in other forms, such as a soft key, on the display 220. In an embodiment, the connector hole 209 may include another connector hole capable of accommodating a connector (e.g., USB connector) for transmitting and receiving power and/or data to and from an external electronic device and accommodating a connector for transmitting and receiving an audio signal to and from an external electronic device. The electronic device 200 may further include, for example, a connector cover that covers at least a portion of the connector hole 209 and blocks the inflow of foreign substances into the connector hole.

In an embodiment, the binding member 250 and the binding member 260 may be detachably attached to at least a partial region of the housing 210 by using the locking member 251 and the locking member 261. The binding member 250 and the binding member 260 may include one or more of a fixing member 252, a fixing member fastening hole 253, a band guide member 254, and a band fixing ring 255.

In an embodiment, the fixing member 252 may be configured to fix the housing 210 and the binding member 250 and the binding member 260 to a part (e.g., wrist, ankle, etc.) of the user's body. The fixing member fastening hole 253 may fix the housing 210 and the binding member 250 and the binding member 260 to a part of the user's body to correspond to the fixing member 252. The band guide member 254 is configured to limit the range of movement of the fixing member 252 when the fixing member 252 is fastened with the fixing member fastening hole 253 so that the binding member 250 and the binding member 260 are brought into close contact with a part of the user's body to be bound thereto. The band fixing ring 255 may limit the range of movement of the binding member 250 and the binding member 260 in a state in which the fixing member 252 and the fixing member fastening hole 253 are fastened to each other.

Referring to FIG. 4, an electronic device 400 (e.g., the electronic device 200 in FIG. 2) may include a lateral bezel structure 410 (e.g., the housing 210 in FIG. 2), a wheel key 202, a front plate 201, a display 220, a first antenna 450, a second antenna 530, a support member 460 (e.g., a bracket), a battery 470, a first printed circuit board 480 (e.g., a printed circuit board (PCB), a printed board assembly (PBA), a flexible PCB (FPCB), or a rigid-flexible PCB), a second printed circuit board 520, a sealing member 490, a rear housing 493, a rear cover 540, a signal detection unit 510 (e.g., the electrode 301 and the electrode 302) and the binding member 250 and the binding member 260 in FIG. 3). At least one of the elements of the electronic device 400 may be the same as or similar to at least one of the elements of the electronic device 200 of FIG. 2 or FIG. 3 and overlapping description thereof will be omitted.

In an embodiment, the support member 460 may be disposed inside the electronic device 400 and connected to the side bezel structure 410, or may be integrally formed with the side bezel structure 410. The support member 460 may be formed of, for example, a metal material and/or a non-metal (e.g., polymer) material. One surface of the support member 460 may be coupled to a display 220 and the other surface thereof may be coupled to the first printed circuit board 480. The printed circuit board 480 may be equipped with a processor, a memory, and/or an interface. The processor may include, for example, one or more of a central processing unit, an application processor, a graphic processing unit (GPU), a sensor processor, or a communication processor.

In an embodiment, the memory may include, for example, a volatile memory or a non-volatile memory. The interface may include, for example, a high definition multimedia interface (HDMI), a universal serial bus (USB) interface, an SD card interface, and/or an audio interface.

In an embodiment, the interface may, for example, electrically or physically connect the electronic device 400 to an external electronic device, and may include a USB connector, an SD card/MMC connector, or an audio connector.

In an embodiment, the battery 470 is a device for supplying power to at least one component of the electronic device 400 and may include, for example, a non-rechargeable primary battery, a rechargeable secondary battery, or a fuel cell. At least a portion of the battery 470 may be, for example, disposed substantially on the same plane as the printed circuit board 480. The battery 470 may be disposed integrally inside the electronic device 200, or may be disposed to be attached to and detached from the electronic device 200.

In an embodiment, the first antenna 450 may be disposed between the display 220 and the support member 460. The first antenna 450 may include, for example, a near field communication (NFC) antenna, a wireless charging antenna, and/or a magnetic secure transmission (MST) antenna. The first antenna 450 may, for example, perform short-range communication with an external device or wirelessly transmit/receive power required for charging, and may transmit a magnetic-based signal including a short-range communication signal or payment data. In another embodiment, the antenna structure may be formed by a part of the side bezel structure 410 and/or the support member 460 or a combination thereof.

In an embodiment, the second antenna 455 may be disposed between the printed circuit board 480 and the rear plate 493. The second antenna 455 may include, for example, a near field communication (NFC) antenna, a wireless charging antenna, and/or a magnetic secure transmission (MST) antenna. The second antenna 455 may, for example, perform short-range communication with an external device or wirelessly transmit/receive power required for charging, and may transmit a magnetic-based signal including a short-range communication signal or payment data. In another embodiment, the antenna structure may be formed by a part of the side bezel structure 410 and/or the rear plate 493 or a combination thereof.

In an embodiment, the sealing member 490 may be positioned between the side bezel structure 410 and the rear plate 493. The sealing member 490 may be configured to block moisture and foreign substances from flowing into the space surrounded by the side bezel structure 410 and the rear plate 493 from the outside. The sealing member 490 may block an electromagnetic signal. For example, the sealing member 490 may perform blocking functions for blocking an electro-magnetic interference (EMI) or other various electrical signals.

In an embodiment, the rear housing 493 and the rear cover 540 may support various components included in the electronic device 400. The rear housing 493 and the rear cover 540 may be included in, for example, the rear plate 207 described with reference to FIG. 3 above.

In an embodiment, at least a portion of the rear cover 540 may be formed of a transparent material through which light may be transmitted. For example, a sensor disposed on the second printed circuit board 520 may include a light-emitting unit for emitting light and a light-receiving unit for receiving light. The light-emitting unit may emit light to the outside through a portion of the rear cover 540 made of a transparent material, and the light-receiving unit may receive light through a portion of the rear cover 540 made of a transparent material. For example, the sensor including the light-emitting unit and the light-receiving unit may include a sensor which measures blood flow using a photoplethysmography (PPG) method to measure information related to a user's heartbeat.

In an embodiment, the signal detection unit 510 may include an electrode (e.g., the electrode 301 and the electrode 302 in FIG. 3) coming in contact with a user's body. For example, at least a portion of the signal detection unit 510 may be formed in a portion of the rear cover 540, which may come in contact with a user's body.

In an embodiment, the second printed circuit board 520 may include at least one of the various components of the electronic device described with reference to FIG. 1 above. In an embodiment, the second printed circuit board 520 may be electrically connected to the first printed circuit board 480 described above. In an embodiment, internal electronic components of the electronic device may be distributively arranged on the first printed circuit board 480 and the second printed circuit board 520. In an embodiment, the second printed circuit board 520 may be connected to the signal detection unit 510 to receive a signal detected by the signal detection unit 510 and process the signal. In some embodiments, a sensing processing circuit or a micro controller unit (MCU), which is distinct from the processor for controlling the overall operation of the electronic device 400, may be disposed on the second printed circuit board 520 and may independently/primarily process a signal detected by the sensor (e.g., a PPG sensor) and/or the signal detection unit 510 disposed on the second printed circuit board.

Figure 5A:
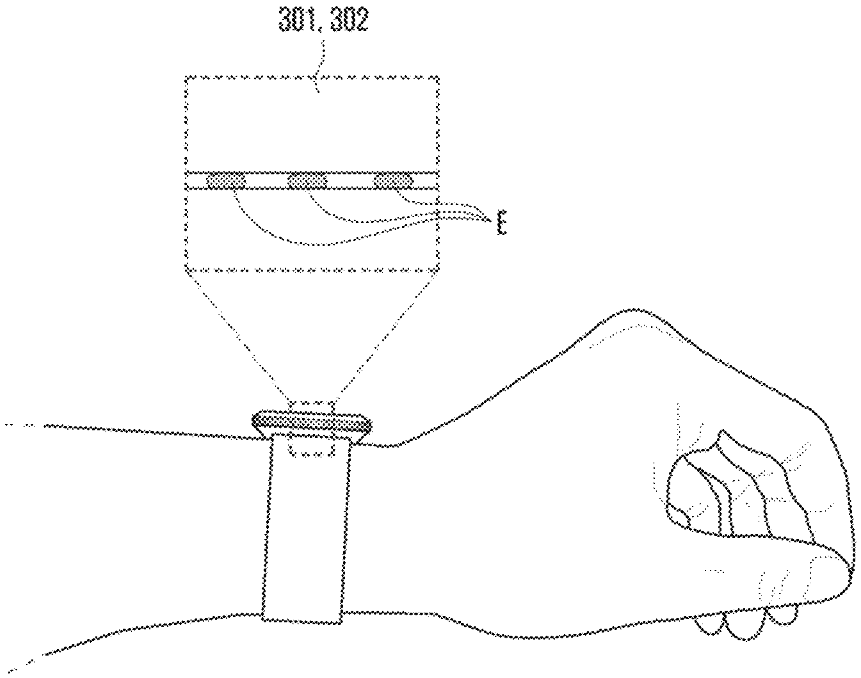
FIG. 5A is a view illustrating a state of wearing an electronic device according to various embodiments of the disclosure.
Figure 5B:
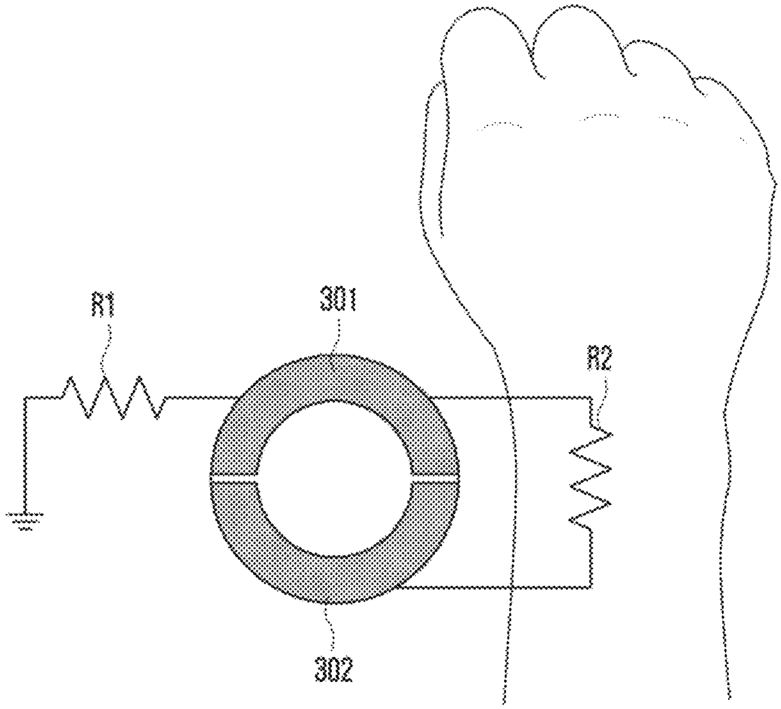
FIG. 5B is a schematic view illustrating simplified electrical connection in a state of wearing an electronic device according to various embodiments of the disclosure.

FIG. 5A is a view illustrating a state of wearing an electronic device according to various embodiments of the disclosure. FIG. 5B is a schematic view illustrating simplified electrical connection in a state of wearing an electronic device according to various embodiments of the disclosure.

The electronic device including components and operation described in the disclosure may include an electronic device in direct contact with a user's body. In an embodiment, the electronic device may include a wearable electronic device which may be worn on a user's body. Hereinafter, the electronic device 200 in the form of a wristwatch shown in FIG. 2, FIG. 3, and FIG. 4 will be described as a representative example. However, the form of the electronic device of the disclosure is not limited to the electronic device 200.

According to various embodiments, the electronic device may include a main body. The main body may refer to a portion constituting the external appearance of the electronic device. For example, the housing structure (e.g., the housing 210 in FIG. 2) described in FIG. 2, FIG. 3, and FIG. 4 may include the front plate 201 in FIG. 2, the rear plate 207 in FIG. 3, the lateral bezel structure 410 in FIG. 4, the rear housing 493 in FIG. 4, and the rear cover 540 in FIG. 4.

According to various embodiments, the electronic device may include at least one electrode 301 or electrode 302 formed of a conductive material capable of transmitting and/or receiving an electrical signal. The electrode 301 or electrode 302 of the electronic device may be disposed on at least a portion of the main body at a portion that may come into contact with the user's body. In an embodiment, the electrode 301 or electrode 302 may be disposed on a portion in which user's body is in continuous contact while wearing the electronic device. For example, in case of a wrist watch-type electronic device as shown in FIG. 5A, a portion (e.g., the second surface or the rear surface 210B in FIG. 3) may be in continuous contact with a portion (e.g., a user's wrist portion in case of FIG. 5) while the electronic device is worn and thus the electrode 301 or electrode 302 may be disposed on the rear surface of the electronic device.

Referring to FIG. 3, the electrode 301 or electrode 302 may be disposed on at least a portion of the rear surface 210B. In an embodiment, multiple electrode 301 and electrode 302 may be formed. The electrode 301 and electrode 302 may be formed to be electrically segmented from each other. As shown in FIG. 3, the electrode 301 and electrode 302 of the electronic device may be segmented and formed in two different areas of the rear surface 210B of the electronic device.

According to an embodiment, the electrode 301 and electrode 302 disposed on at least a portion of the rear surface 210B of the electronic device may operate as at least one of sensors for measuring bio-signals. The electronic device disclosed herein may measure various biometric information of the user by using various methods (e.g., photoplethysmography (PPG), electrocardiogram (ECG), galvanic skin response (GSR), electroencephalogram (EEG), and/or bioelectrical impedance analysis (BIA), etc.). For example, the electronic device may measure the user's biometric information by acquiring various signals including optical signals and electrical signals and applying the above-described method to the acquired signals.

In an embodiment, an optical signal may be acquired through a sensor (e.g., the sensor module 176 in FIG. 1 and the sensor module 211 in FIG. 3) included in the electronic device to measure biometric information. In addition, biometric information may be measured by acquiring an electrical signal through the electrode 301 and electrode 302 in contact with the user's body (e.g., the wrist). In case that the electrode 301 and electrode 302 come into contact with the human body, the electrode 301 and electrode 302 and the user's body may constitute one closed circuit.

According to an embodiment, a sensor (e.g., the sensor module 176 in FIG. 1, or the sensor module 211 in FIG. 3) may include at least one of an electrocardiogram (ECG) sensor, an electrodermal activity (EDA) sensor, an electroencephalography (EEG) sensor, or a bioelectrical impedance analysis (BIA) sensor.

According to various embodiments, in case that the mutually segmented electrode 301 and electrode 302 come into contact with the skin, the skin may electrically connect the mutually segmented electrode 301 and electrode 302. For example, as shown in FIG. 5B, the user's skin may function as an external resistor R2 disposed between the electrode 301 and electrode 302.

In case that a foreign substance E is introduced between the skin and the electrode 301 and electrode 302 due to various factors, a contact resistance between the electrode 301 and electrode 302 and the skin may be changed. For example, the foreign substance E may be introduced between the skin and the electrode 301 and electrode 302 due to bodily wastes excreted from the user's skin, various foreign substances E introduced from the external environment, and the like. In case that the foreign substance E is moisture, the contact resistance R2 between the electrode 301 and electrode 302 and the skin may be lowered.

The electronic device has various components that generate heat during operation, and the heat may be emitted continuously. In case that moisture exists between the electronic device and the user's skin, the moisture may function as a heat transfer medium to promote transfer of heat from the electronic device to the skin. For this reason, even if a temperature of the electronic device is not a temperature causing burns, low-temperature burns may be caused by continuous heat transfer.

According to various embodiments, the processor may identify an electrical value by using the electrode 301 and electrode 302 in contact with the skin. Here, the electrical value may include all electrical values that may be used for identifying a change in the contact resistance R2 between the skin and the electrode 301 and electrode 302. For example, a change in the contact resistance R2 may be identified through a change in current or voltage applied to the electrode 301 and electrode 302.

In an embodiment, as shown in FIG. 5B, assuming that the resistance inside the electronic device is R1 and the contact resistance between the electrode 301 and electrode 302 and the skin is R2, a circuit in which R1 and R2 are connected in series may be configured. For example, in case that the contact resistance R2 decreases, a voltage measured at the electrode 301 and electrode 302 may increase. In another embodiment, in case that a circuit in which the internal resistance R1 and the contact resistance R2 of the electronic device are connected in parallel is configured, a change in the contact resistance R2 may be identified through a change in current. In addition, the change in the contact resistance R2 may be identified by configuring a circuit in various schemes. Hereinafter, as shown in FIG. 5B, a method for connecting the contact resistance R2 and the internal resistance R1 in series and measuring the change of the contact resistance R2 through a change in voltage will be described.

In case that moisture is introduced between the electrode 301 and electrode 302 and the skin, the contact resistance R2 may decrease due to moisture having a lower specific resistance than the skin. Accordingly, the voltage between the electrode 301 and electrode 302 may increase.

For example, the internal resistance R1 may be 200 Mohm, and the voltage applied to one of the electrodes 301 and 302 may be 1.8 V. Here, by measuring a voltage applied between the electrodes 301 and 302, the change in the contact resistance R2 may be measured. In case that a range of the contact resistance R2 is from about 33.33 Mohm to about 300 Mohm, it may be determined that the skin is in a dry state because moisture is relatively small between the electrodes 301 and 302 and the skin. In case that a range of the contact resistance R2 is lower than about 33.33 Mohm, it may be determined that the contact resistance R2 is decreased due to the introduction of moisture between the electrodes 301 and 302 and the skin. In case that the contact resistance R2 is greater than about 300 Mohm, it may be determined that there is no contact between the electrodes 301 and 302 and the user's body.

According to various embodiments, a voltage value measured at the electrode may be directly transmitted to the processor, or a separate microcontroller (MCU) for receiving the voltage value may be directly connected to the electrodes 301 and 302 so as to identify the change of voltage to be measured in more detail.

Figure 6:
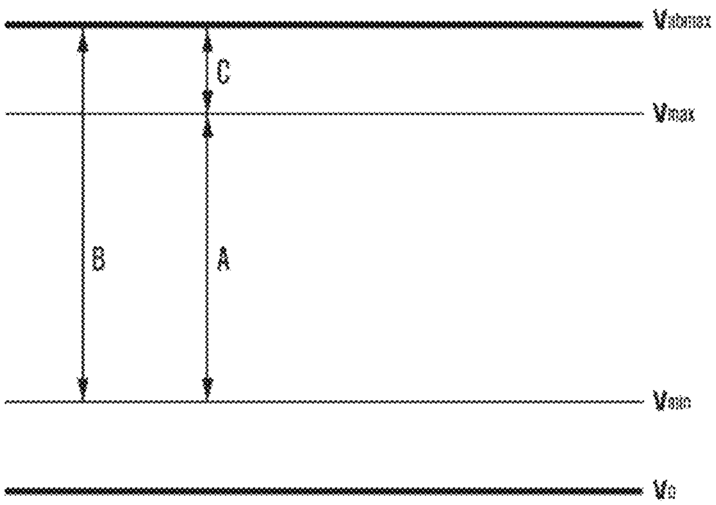
FIG. 6 is a graph comparing voltages measured through an electrode of an electronic device according to various embodiments of the disclosure in a normal state and in a state in which moisture is introduced.

FIG. 6 is a graph comparing voltages measured through an electrode of an electronic device according to various embodiments of the disclosure in a normal state and in a state in which moisture is introduced.

Referring to FIG. 6, it may be identified that a voltage change range (B) is larger in a state in which moisture is introduced between the electrode and the skin than a voltage change range (A) in the normal state. For example, in the normal state, the voltage change range A may be measured between a minimum voltage Vmin and a maximum voltage Vmax with respect to a reference voltage Vo. In the state in which moisture is introduced, the voltage change range B may be measured between a minimum voltage Vmin and an abnormal voltage Vabmax with respect to the reference voltage Vo. The maximum value (V max) of the voltage shown in FIG. 6 may be measured as about 1.35 V, and the maximum value of the voltage in the state in which moisture is introduced may be measured as about 1.8 V (V abmax). As such, a higher voltage may be measured in the state in which moisture is introduced.

Vmin, Vmax, and Vabmax described in FIG. 6 are merely examples, and may be variously changed depending on various factors such as a circuit connected to the electrode and conductivity of the electrode. For example, the voltage change range A in the normal state may indicate a voltage range generally (or statistically) measured when the electrode is in contact with the skin in a dry state. As such, the processor may determine whether moisture is introduced between the skin and the electrode by identifying the voltage applied to the electrode.

For example, a performance control operation of the electronic device described below may be performed in case that a voltage to be measured falls within a range C that exceeds Vmax illustrated in FIG. 6. In case that a voltage exceeding Vmax is measured, it may be expected that moisture exists between the electrode and the skin, so it may be determined as a situation requiring more active performance control.

In the disclosure, "performance limitation" may be an example of performance control of an electronic device for reducing an exothermic phenomenon caused by an operation of the electronic device. "Performance limitation" mentioned below is intended to suppress the exothermic phenomenon of the electronic device to the last, and should not be interpreted by excessively extending or distorting the meaning. Based on the spirit of the disclosure and the purpose of using the term, "performance limitation" used hereinafter should be interpreted as one of various types of performance control for suppressing or resolving the exothermic phenomenon of an electronic device. For example, the performance limitation may include all of various operations such as reducing power applied to an electronic component causing heat, adjusting a degree of operation, or deactivating the corresponding electronic component.

Figure 7:
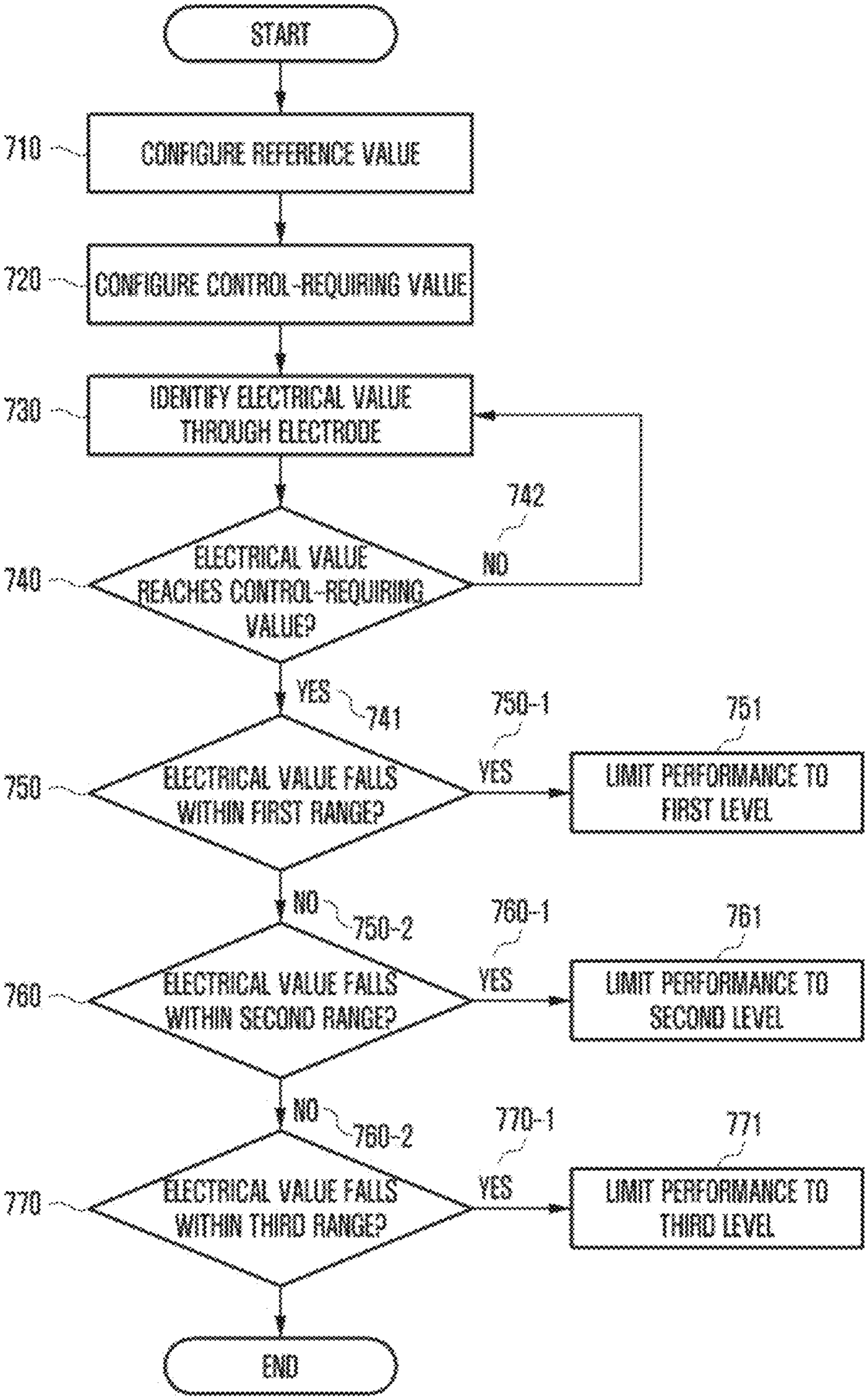
FIG. 7 is a flowchart of a performance control operation of an electronic device according to various embodiments of the disclosure.

FIG. 7 is a flowchart of a performance control operation of an electronic device according to various embodiments of the disclosure. For example, an operation of limiting performance of the electronic device to a specified range (e.g., a stage) may be included. FIGS. 8A and 8B are graphs illustrating a process of configuring a control-requiring value and range of an electronic device according to various embodiments of the disclosure.

According to various embodiments, a processor (e.g., the processor 120 in FIG. 1) may identify a voltage measured at an electrode (e.g., the electrode 301 or the electrode 302 in FIG. 5B) and compare the voltage with a preconfigured control-requiring value. In case that the electrical value to be measured at the electrode is determined with a voltage, the control-requiring value may also be a specific voltage to enable comparison. The preconfigured control-requiring value may be preconfigured in a manufacturing process of the electronic device and stored in a memory of the electronic device, or may be a value arbitrarily configured by a user. According to various embodiments, the processor may omit the operation of configuring the control-requiring value. For example, in case of using a preconfigured control-requiring value stored in the memory of the electronic device and/or configured by the user, the processor may omit operation 720 and use the preconfigured control-requiring value as a default value.

According to various embodiments, the processor may configure a reference value (710). The control-requiring value may be determined according to a reference value (range). The reference value may be a reference for determining the control-requiring value. For example, the processor may configure a range of a voltage measured through an electrode immediately after the electronic device is worn as a reference value. In an embodiment, the reference value may be configured of an average of multiple voltages measured at a predetermined time interval after the electronic device is worn. In addition, the reference value may be configured of a voltage range rather than a specific voltage. For example, in FIG. 8A, the reference value 810 may be about 0.5 V. In FIG. 8B, the reference value 820 may be about 0.9 V.

According to various embodiments, the processor may configure a control-requiring value (720). For example, the processor may configure the control-requiring value by applying a preconfigured ratio based on the reference value. For example, a voltage that is increased by 60% of the maximum voltage in the voltage range included in the reference value may be determined as the control-requiring value. In case that the reference value (range) 810 as shown in FIG. 8A is identified, the control-requiring value 811 may be determined to be about 0.9 V. In case that the reference value (range) 820 as shown in FIG. 8B is identified, the control-requiring value 821 may be determined to be about 1.2 V. The reference value may vary according to manufacturing deviations of the electronic device, the user's environment, and the user's skin characteristics and/or condition, and accordingly the control-requiring value is configured, and thus a control-requiring value suitable for the user may be determined. In another embodiment, the reference value may be a range of voltages to be measured through the electrode immediately after the battery of the electronic device is fully charged and then worn. In the case of a lithium-ion battery, as the battery is discharged, an output voltage fluctuates, so a voltage at a time point of full charge may be used as a reference value.

According to various embodiments, the control-requiring value may be configured using a voltage configured as the reference value and a maximum voltage of a circuit connected to the electrode. For example, the X-axis of the graph shown in FIG. 8A and FIG. 8B may be arbitrarily defined as "moisture level". The moisture level is arbitrarily defined to configure the control-requiring value by using the measured voltage, and thus may be substituted with other terms.

Figure 8:
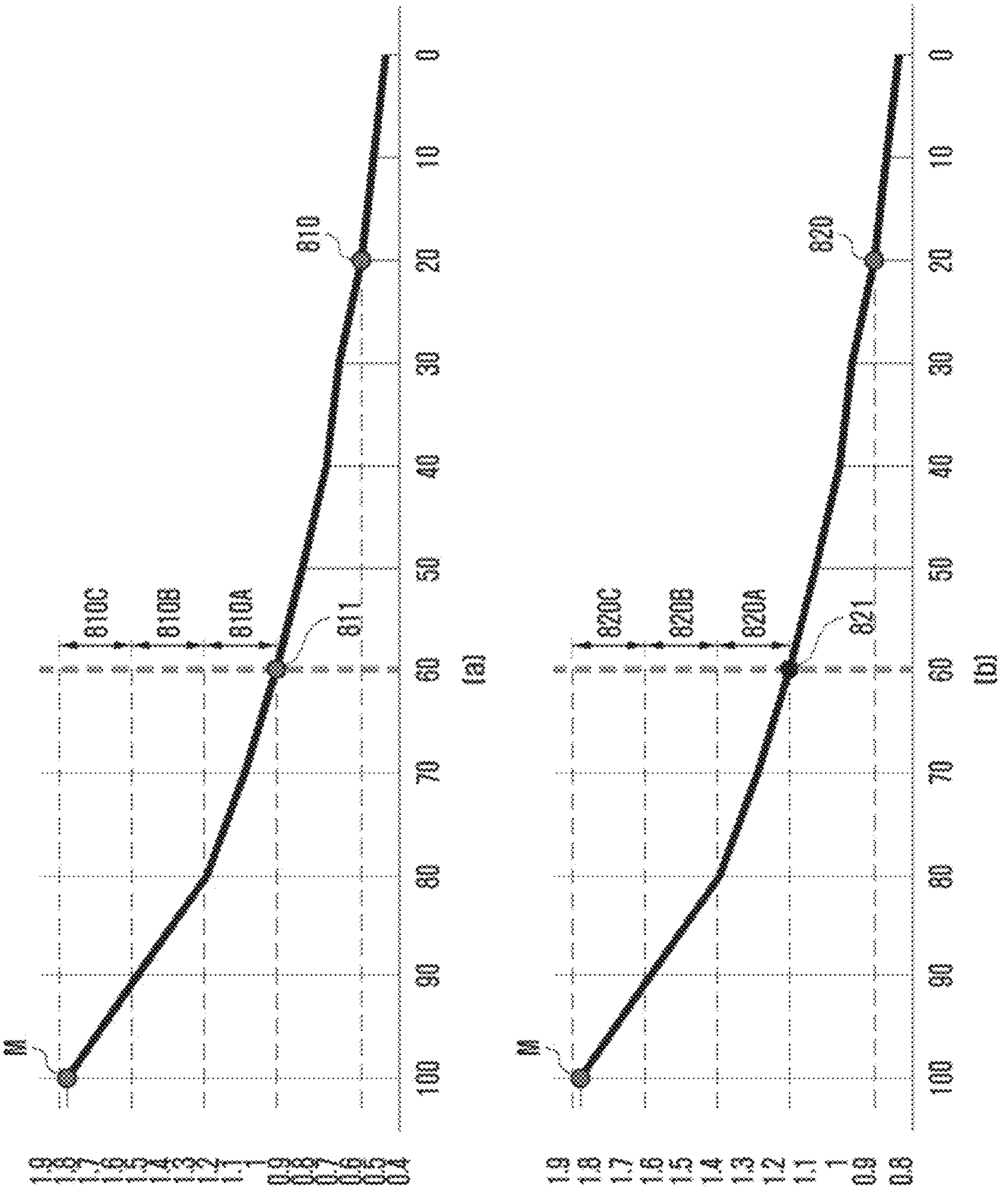
FIG. 8 is a graph illustrating a process of configuring a control-requiring value and range of an electronic device according to various embodiments of the disclosure.

Referring to FIG. 8, in case that a moisture level is 20 in the reference value and a moisture level in a maximum voltage is 100, a voltage having a moisture level of 60 may be configured as a control-requiring value. Here, the moisture level does not indicate humidity according to moisture between the electronic device and the skin, but may be a parameter arbitrarily introduced to configure the control-requiring value.

For example, it will be described assuming that a circuit having a maximum voltage M of 1.8 V. In FIG. 8A, the reference value 810 may be about 0.5 V. The moisture level of 0.5 V may be configured to 20, and the moisture level of 1.8 V, which is a maximum voltage (M), may be configured to 100. Here, a voltage (about 0.9 V) at which the moisture level becomes 60 may be configured as the control-requiring value 811. Alternatively, in FIG. 8B, the reference value 820 may be about 0.9 V. The moisture level of 0.9 V may be configured to 20, and the moisture level of 1.8 V, which is a maximum voltage (M), may be configured to 100. Here, a voltage (about 1.2V) at which the moisture level becomes 60 may be configured as the control-requiring value 821. The description above is merely an example and the control-requiring value may be configured according to the reference value in various other methods.

In various embodiments, the control-requiring value may be preconfigured in a manufacturing process of the electronic device and stored in a memory of the electronic device, or may be a value arbitrarily configured by a user and stored in the memory by a control requirement configuration operation. For example, as shown in FIGS. 8A and 8B, the voltage measured through the electrode at a point where humidity between the electrode and the skin becomes 60% may be configured as a control-requiring value. In case that the humidity becomes 60%, the voltage to be measured may be acquired by statistical analysis through experiments.

The control-requiring value configuration operation 720 in FIG. 7 may include an operation in which the control-requiring value is configured with the preconfigured value. In case that the control-requiring value is the preconfigured value, the control-requiring value may correspond to a value independent of the reference value. In this case, the operation 710 of configuring the reference value may be omitted.

According to various embodiments, the processor may identify an electrical value through the electrode (730). For example, the processor may identify a voltage through the electrode.

The processor may determine whether the electrical value reaches a control-requiring value (740). According to various embodiments, in case that a voltage to be measured at the electrode reaches the control-requiring value (741), the processor may determine that performance control of the electronic device is necessary, and perform an operation of limiting performance of the electronic device in operation 750 to operation 771. In case that a voltage to be measured at the electrode does not satisfy the control-requiring value (742), the processor may repeatedly perform operation 730. For example, the processor may measure a voltage at the electrode every specific period, and in case that the measured voltage continuously reaches the control-requiring value for a preconfigured number of times, the processor may determine that performance control of the electronic device is necessary. Through periodic voltage measurement, it is possible to prevent unnecessary performance limitation operation due to a temporary voltage increase.

According to various embodiments, in case that a voltage to be measured at the electrode reaches the control-requiring value, the processor may identify whether the measured voltage continuously reaches the control-requiring value for a predetermined time. The processor may not immediately perform the performance control operation when the measured voltage reaches the control-requiring value, and periodically measure the voltage for a preconfigured time to perform the control operation only when the voltage continues to reach the control-requiring value. Through this identification operation, unnecessary performance control for a temporary voltage change may be prevented from being performed.

According to various embodiments, in case that the measured voltage reaches a control-requiring value, a circuit for generating a signal may be connected to the processor. For example, a circuit for detecting that the voltage measured at the electrode reaches the control-requiring value may be connected to a general purpose input output (GPIO) pin of the processor. The processor may perform the following performance control according to an electrical signal applied through the GPIO pin.

In an embodiment, the performance control of the electronic device may be performed in various manners. The processor may limit performance of the electronic device in a manner of limiting performance of an electronic component that generates a relatively large amount of heat due to an operation thereof. Examples of the electronic components may include the processor, a memory (e.g., the memory 130 in FIG. 1), a communication module (e.g., the communication module 190 in FIG. 1), and a sensor module (e.g., the sensor module 176 in FIG. 1).

In an embodiment, the processor may limit performance of the processor in a manner such as limiting an operating clock of the processor or limiting a magnitude of a voltage (or current) applied to the processor.

In an embodiment, the processor may limit performance of the memory in a manner such as limiting an operation clock of the memory, limiting a magnitude of a voltage (or current) applied to the memory, or changing RAM timing.

In an embodiment, the processor may limit performance of the sensor module in a manner such as lowering sensitivity of the sensor module, adjusting an operation frequency, or deactivating the sensor module. For example, in case that the user is not exercising, an operating frequency of a sensor (e.g., a photoplethysmography (PPG) sensor) for measuring a heartbeat may be adjusted.

In an embodiment, the processor may limit performance of the communication module in a manner such as adjusting reception sensitivity of the communication module or adjusting transmission power.

The performance limitation operation described above is merely an example, and the processor may limit the performance of the electronic device in various manners. As such, by limiting the performance, heat emitted from the electronic device may be reduced, thereby protecting the user from the risk of low-temperature burns.

According to various embodiments, in case that the voltage measured through the electrode reaches the control-requiring value (741), in operation 750, operation 751, operation 670, operation 761, operation 770, and operation 771, the processor may limit the performance of the electronic device to a different degree depending on the level of the measured voltage.

In an embodiment, the processor may determine whether the measured voltage falls within a first range and a second range which is divided and configured in advance. The first range may be a range including a lower voltage than the second range. Since the risk of low-temperature burns may be greater in the case that the measured voltage falls within the second range than the case that the measured voltage falls within the first range, a more aggressive performance limitation may be required in the case that the measured voltage falls within the second range than the case that the measured voltage falls within the first range. In case that the measured voltage falls within the first range, the processor may limit the performance of the electronic device to a first level, and in case that the measured voltage falls within the second range, limit the performance of the electronic device to a second level. The performance limitation of the second level may have a higher level of performance limitation than the performance limitation of the first level. For example, in the first level, the operating clock of the processor may be limited to 90% of the maximum operating clock, and in the second level, the operating clock of the processor may be limited to 80% of the maximum operating clock. Even in case that performance limitation through a voltage is required, performance is not uniformly limited, and performance is limited according to a level of the measured voltage, so that it is possible not to limit the performance of the electronic device more than necessary while detecting the risk of low-temperature burns of the user.

As shown in FIG. 7 and FIG. 8, it is also possible to further subdivide the range. In case of FIG. 8A, the processor may configure the reference value 810 to be about 0.5 V and the control-requiring value 811 to be about 0.9 V through the operation 710 of configuring the reference value and the operation 720 of configuring the control-requiring value. In case of FIG. 8B, the processor may configure the reference value 820 to be about 0.9 V and the control-requiring value 812 to be about 1.2 V through the operation 710 of configuring the reference value and the operation 720 of configuring the control-requiring value. For example, the range may be divided into three parts. For example, it is possible to determine whether the voltage measured through the electrode falls within a first range 810A or 820A, a second range 810B or 820B, or a third range 810C or 820C, and to limit the performance accordingly. The processor may determine whether the measured voltage falls within the first range (750). In case that the measured voltage falls within the first range (750-1), the performance of the electronic device may be limited to the first level (751). In case that the measured voltage does not fall within the first range (750-2), the processor may determine whether the measured voltage falls within the second range (760). In case that the measured voltage falls within the second range (760-1), the performance of the electronic device may be limited to the second level (761). In case that the measured voltage does not fall within the second range (760-2), the processor may determine whether the measured voltage falls within the third range (770). In case that the measured voltage falls within the second range (770-1), the performance of the electronic device may be limited to a third level (771).

In an embodiment, in the first level, the operating clock of the processor may be limited to 90% of the maximum operating clock, in the second level, the operating clock of the processor may be limited to 80% of the maximum operating clock, and in the third level, the operation clock of the processor may be limited to 70% of the maximum operating clock.

As shown in FIG. 8A and FIG. 8B, in case that reference values are different so that control-requiring values are different, voltage ranges corresponding to the first range, the second range, and the third range may also be different. For example, the first range 810A, the second range 810B, and the third range 810C in FIG. 8A may have a voltage range lower than the first range 820A, the second range 820B, and the third range 820C in FIG. 8B, respectively.

FIG. 9 is tables illustrating one of performance control methods of an electronic device according to various embodiments of the disclosure.

According to various embodiments, the processor may vary the performance limit level as the voltage measured through the electrode is maintained within a specific range for a specific period of time.

Figure 11:
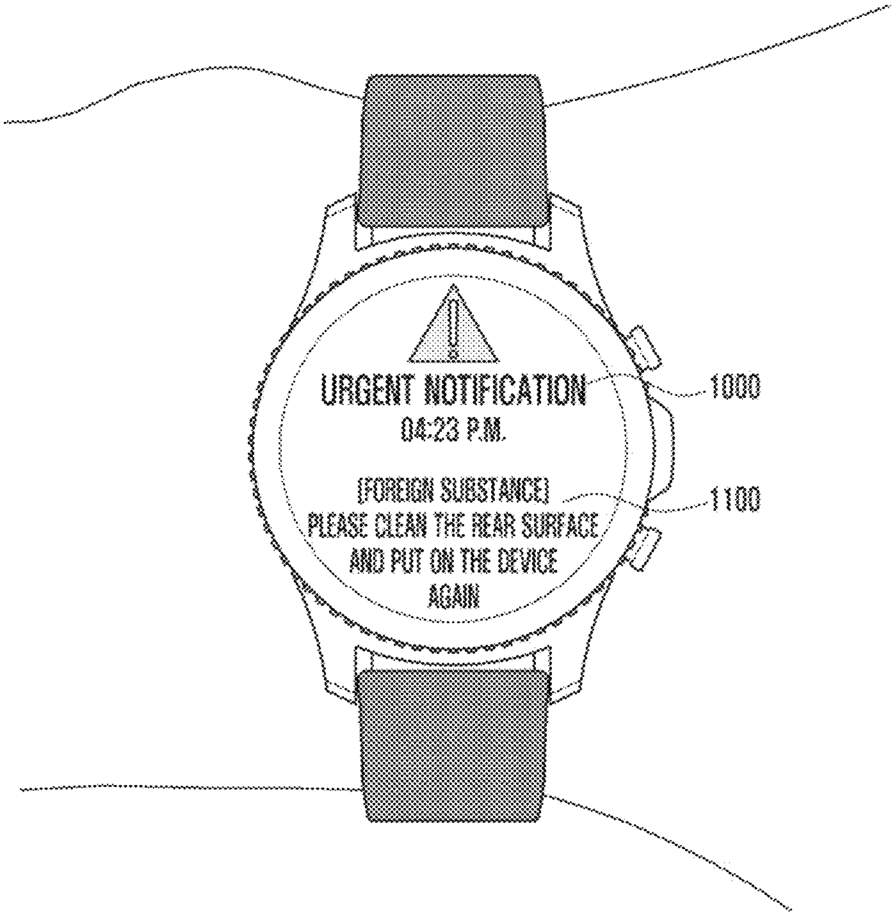
FIG. 11 is a view illustrating an embodiment of displaying an alarm on a display of an electronic device according to various embodiments of the disclosure.
Figure 12A:
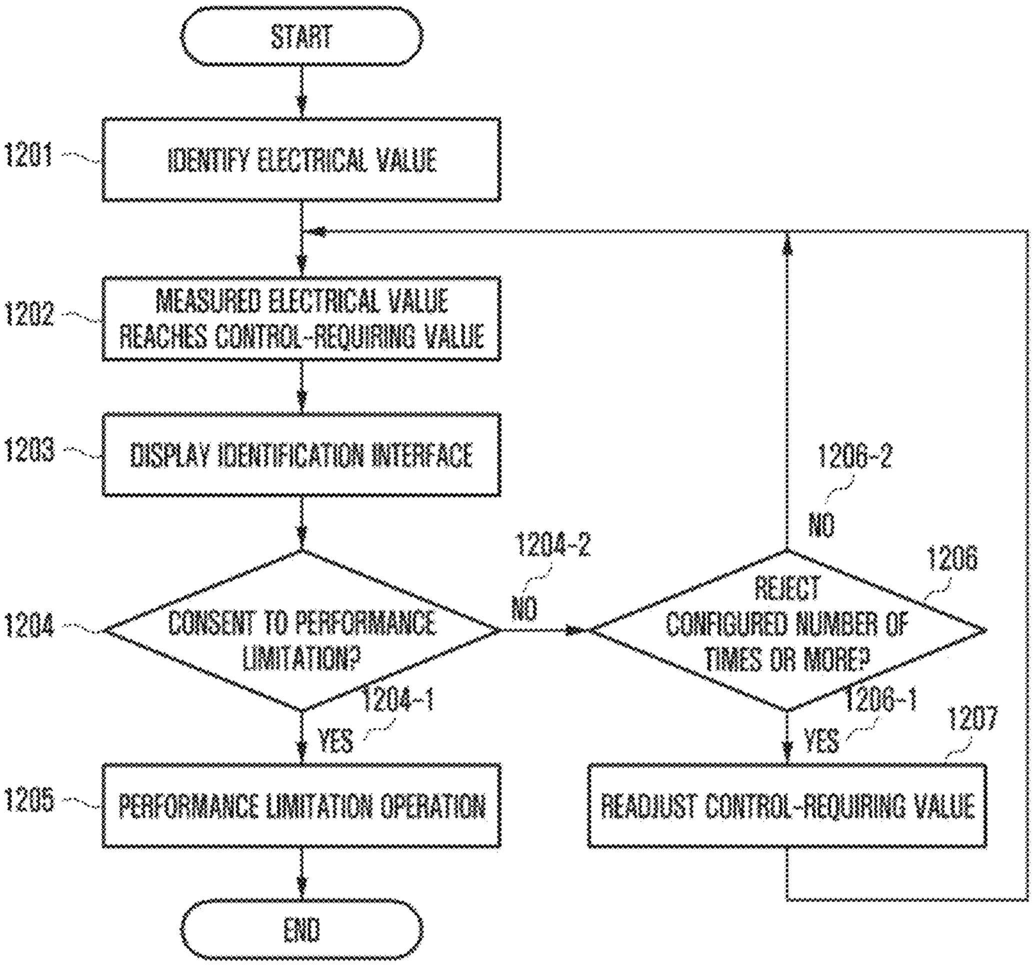
FIG. 12A is a flowchart of a performance control operation according to a user input in an electronic device according to various embodiments of the disclosure.
Figure 12B:
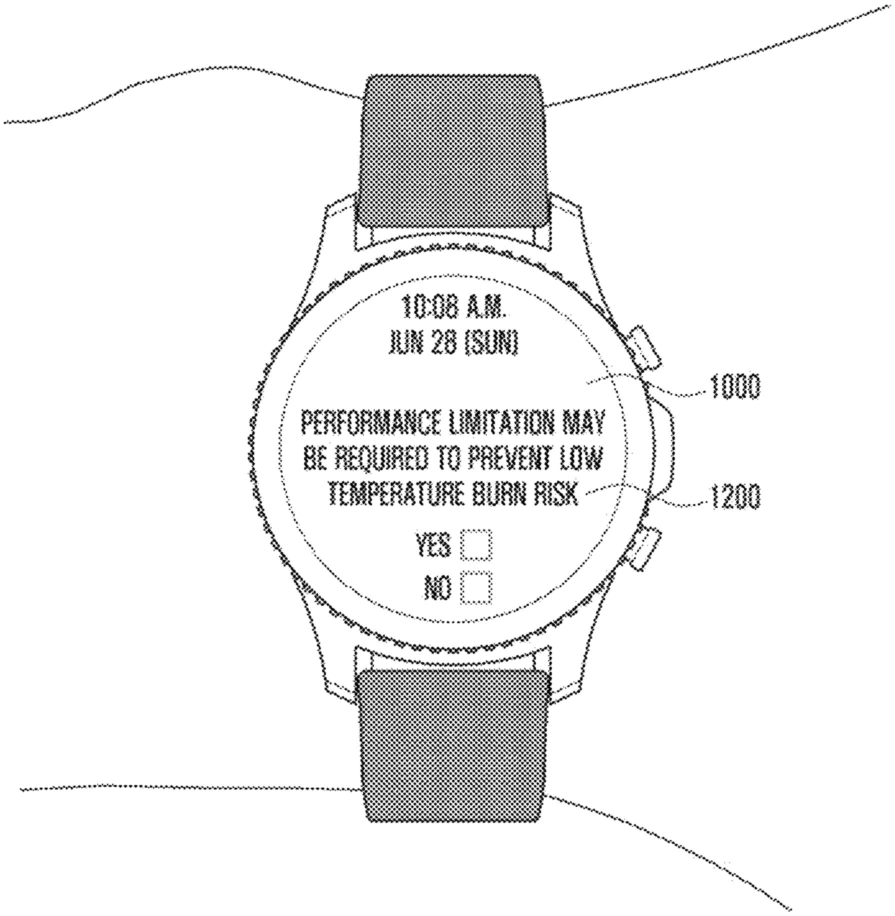
FIG. 12B is a view illustrating an embodiment of displaying an alarm on a display of an electronic device according to various embodiments of the disclosure.

For example, FIG. 9 shows tables (e.g., PAM MAX Power limitation) illustrating a performance limitation method for limiting a maximum power of pulse amplitude modulation (PAM). In case that the measured voltage falls within the first range, the maximum power is limited by −2.5 dBm (the first level), in case that the measured voltage falls within the second range, the maximum power is limited by −5 dBm (the second level), and in case that the measured voltage falls within the third range, the maximum power is limited by −7 dBm (the third level). According to an embodiment, when a situation in which the measured voltage falls within the first range and the performance is limited by −2.5 dBm continues for 2 hours, performance limitation width may be increased to −5 dBm corresponding to the second level performance limit even if the measured voltage falls within the first range. According to an embodiment, when a situation in which the measured voltage falls within the second range and the performance is limited by −5 dBm continues for 2 hours, performance limitation width may be increased to −7 dBm corresponding to the third level performance limit even if the measured voltage falls within the second range. According to an embodiment, when the measured voltage does not drop even after performing the second level performance limitation, the performance limitation width may be further increased by −7 dBm corresponding to the third level performance limitation. For example, in case that a re-measured voltage is changed from the first range to the second range after performing the second level performance limitation, the performance limitation width may be further increased by −7 dBm corresponding to the second level performance limitation. According to an embodiment, the processor may determine the performance limitation based on an elapsed time and a state change. For example, in case that the measured voltage falls within the first range, the performance is limited by −2.5 dBm, and the re-measured voltage is changed from the first range to the second range after a limiting situation (an elapsed time) lasts for 2 hours, the first level performance limitation may be changed to the third level performance limitation without going through the second level performance limitation. FIG. 10A, FIG. 10B, and FIG. 10C are views illustrating an embodiment of displaying an alarm on a display of an electronic device according to various embodiments of the disclosure. FIG. 11 is a view illustrating an embodiment of displaying an alarm on a display of an electronic device according to various embodiments of the disclosure. FIG. 12A is a flowchart of a performance control operation according to a user input in an electronic device according to various embodiments of the disclosure. FIG. 12B is a view illustrating an embodiment of displaying an alarm on a display of an electronic device according to various embodiments of the disclosure.

According to various embodiments, as shown in FIG. 10A, FIG. 10B, and FIG. 10C, the processor may control display of the display interface 1010A, the display interface 1010B, and the display interface 1010C on a display 1000 (e.g., the display module 160 in FIG. 1) so that a user may identify a state of limiting performance. For example, by changing the shape, size, and/or color of the display interface 1010A, the display interface 1010B, and the display interface 1010C according to the performance limitation level, the user may identify to what extent the performance is limited. For example, the display interface 1010A, the display interface 1010B, and the display interface 1010C of FIG. 10A, FIG. 10B, and FIG. 10C may be distinguished from each other. FIG. 10A may show the display interface is a display interface 1010A displayed when performance is limited to the first level, FIG. 10B may show a display interface 1010B displayed when performance is limited to the second level, and FIG. 10C may show a display interface 1010C displayed when performance is limited to the third level.

According to various embodiments, as shown in FIG. 11, when the voltage measured through the electrode does not fall below the control-requiring value for a preconfigured time even if the performance of the electronic device is limited, a warning interface 1100 may be displayed through the display 1000. The processor may limit the performance of the electronic device to the first level or the second level and re-identify the voltage measured through the electrode. In case that the re-identified voltage for a preconfigured time exceeds the control-requiring value, the warning interface 1100 may be displayed. For example, as shown in FIG. 11, by displaying the warning interface 1100 such as “Please clean the rear surface and put on the device again”, it is possible to induce the user to take an appropriate action.

According to various embodiments, as shown in FIG. 12B, the processor may display the identification interface 1200 on the display 1000 before performing the performance limitation operation. The processor may identify the voltage measured through the electrode (1201). The processor may identify whether the measured voltage reaches the control-requiring value (1202). Based on operation 1202, the processor may display the identification interface 1200 on the display (1203). The processor may identify whether the user consents to the performance limitation through the identification interface 1200 (1204). The identification interface 1200 may be an interface for acquiring a user’s consent for the performance limitation. For example, as shown in FIG. 12B, the processor may display a check box such as “Yes, No” in order to receive a user’s selection together with a phrase such as “Performance limitation may be required to prevent low-temperature burn risk” on the display 1000 (1204). In case that the user selects “Yes”, it may be determined that the user consents to the performance limitation (1204-1). In this case, the performance may be limited according to a range within which the measured voltage falls (1205). In case that the user selects “No”, it may be determined that the user does not consent to the performance limitation (1204-2). In this case, the performance limitation operation may not be performed. The processor may identify whether the number of times the user rejects the performance limitation reaches the configured number of times (1206). In an embodiment, the processor may store the number of times the user has selected not to perform the performance limitation operation. In case that the number of times the user rejects the performance limitation is greater than or equal to the preconfigured number (1206-1), the control-requiring value may be readjusted (1207). For example, in case that the number of times the user rejects the performance limitation is 3 or more, a voltage of the control-requiring value may be increased by +0.5 V. Each user may have a different dangerous temperature for low-temperature burns, and a different perceived temperature. Through the feedback, the control-requiring value suitable for the user may be determined. If the number of times of rejecting the performance limitation is less than the preconfigured number (1206-2), the process may be returned to operation 1202. Here, if operation 1202 is immediately performed, the measured voltage will reach the control-requiring value, and thus the voltage may not be measured for a predetermined period of time.

Figure 13:
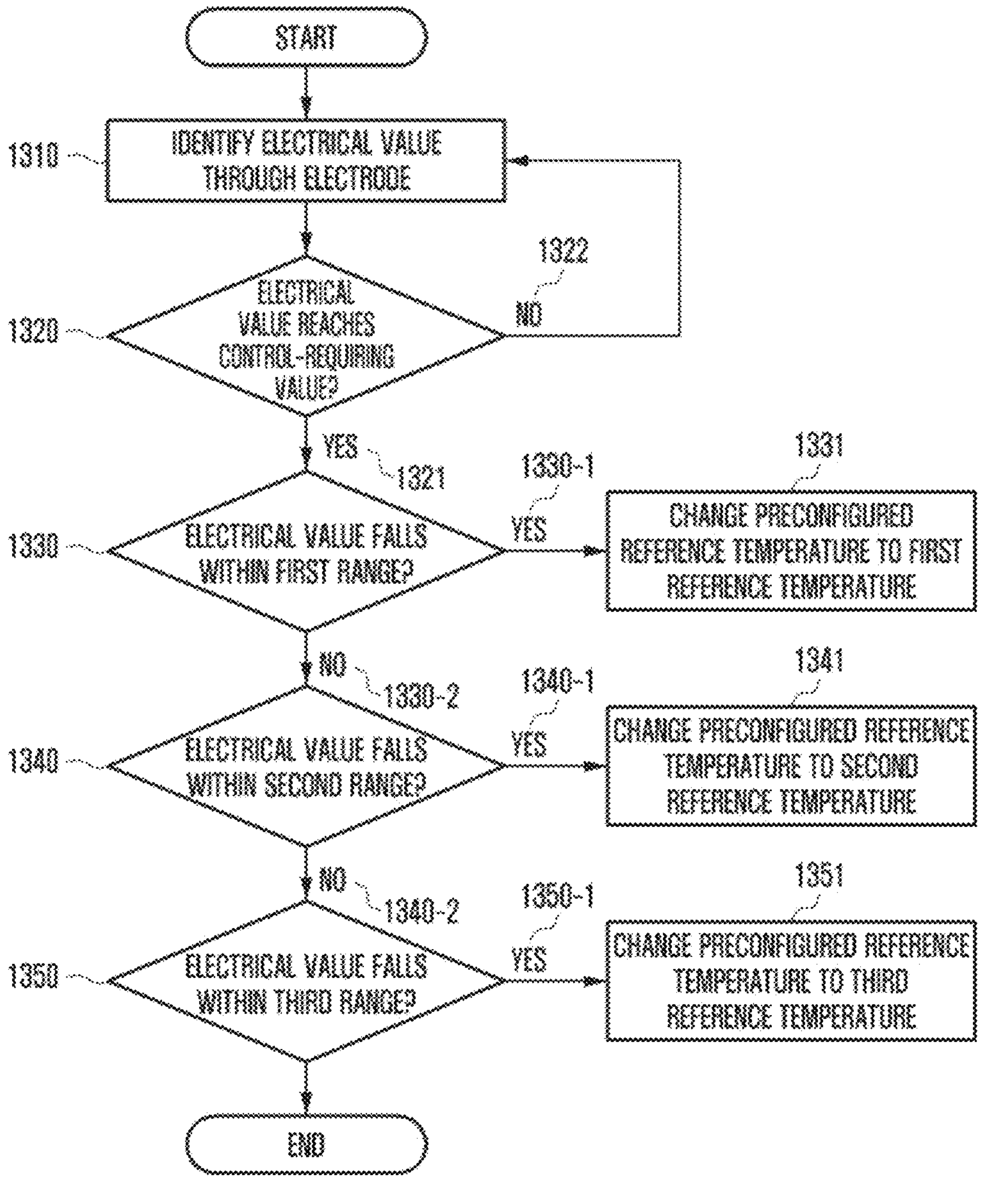
FIG. 13 is a flowchart of a temperature control operation of an electronic device according to another embodiment of the disclosure.

FIG. 13 is a flowchart of a temperature control operation of an electronic device according to another embodiment of the disclosure.

According to various embodiments, the electronic device may be an electronic device including a temperature sensor capable of measuring an internal temperature of the electronic device. The processor may compare a temperature measured by the temperature sensor with a preconfigured reference temperature and, and in case that the measured temperature reaches the preconfigured temperature, may perform an operation of limiting the performance of the electronic device.

In an embodiment, the performance control of the electronic device may be performed in various manners. The processor may limit performance of the electronic device in a manner of limiting performance of an electronic component that generates a relatively large amount of heat due to an operation thereof. Examples of the electronic components may include a processor (e.g., the processor 120 in FIG. 1), a memory (e.g., the memory 130 in FIG. 1), a communication module (e.g., the communication module 190 in FIG. 1), and a sensor module (e.g., the sensor module 176 in FIG. 1).

In an embodiment, the processor may limit performance of the processor in a manner such as limiting an operating clock of the processor or limiting a magnitude of a voltage (or current) applied to the processor.

In an embodiment, the processor may limit performance of the memory in a manner such as limiting an operation clock of the memory, limiting a magnitude of a voltage (or current) applied to the memory, or changing RAM timing.

In an embodiment, the processor may limit performance of the sensor module in a manner such as lowering sensitivity of the sensor module, adjusting an operation frequency, or deactivating the sensor module. For example, in case that the user is not exercising, an operating frequency of a sensor (e.g., a photoplethysmography (PPG) sensor) for measuring a heartbeat may be adjusted.

In an embodiment, the processor may limit performance of the communication module in a manner such as adjusting reception sensitivity of the communication module or adjusting transmission power.

The performance limitation operation described above is merely an example, and the processor may limit the performance of the electronic device in various manners. As such, by limiting the performance, heat emitted from the electronic device may be reduced, thereby protecting the user from the risk of low-temperature burns.

According to various embodiments, the processor may identify a voltage measured at an electrode (1310). In an embodiment, the processor may identify a voltage measured at the electrode based on a temperature of the electronic device measured through the temperature sensor being greater than or equal to a specific temperature.

According to various embodiments, the processor may determine whether the voltage measured at the electrode reaches the control-requiring value (1320). In case that the measured voltage reaches the control-requiring value (1321), the processor may change a preconfigured reference temperature corresponding to a reference temperature at which performance control of the electronic device is started. In case that the measured voltage does not reach the control-requiring value (1322), it may be returned to operation 1310.

In an embodiment, the processor may change the preconfigured reference temperature of the electronic device to be lower than before. In this case of changing, the performance control of the electronic device may be started at a lower temperature than before. In case that the voltage measured at the electrode satisfies the control-requiring value, since there is a risk of low-temperature burns, more active performance control may be required. By lowering the preconfigured reference temperature, the processor may actively block a temperature rise by controlling the performance of the electronic device even at a lower temperature level.

According to various embodiments, the control-requiring value may be determined according to a reference value. The description of determining the control-requiring value according to the reference value is the same as that described with reference to FIG. 8A and FIG. 8B, and thus a detailed description thereof will be omitted.

For example, the processor may measure a voltage at the electrode every specific period, and in case that the measured voltage continuously satisfies the control-requiring value for a preconfigured number of times, the processor may determine that a preconfigured reference temperature change is necessary. Through periodic voltage measurement, it is possible to prevent the preconfigured reference temperature from being unnecessarily changed according to a temporary voltage rise.

According to various embodiments, in case that the voltage measured through the electrode satisfies the control-requiring value, the processor may change the preconfigured reference temperature to a different degree according to a level of the measured voltage.

According to various embodiments, in case that a voltage to be measured at the electrode reaches the control-requiring value, the processor may identify whether the measured voltage continuously reaches the control-requiring value for a predetermined time. In case that the measured voltage reaches the control-requiring value, the processor may not immediately perform an operation of changing the preconfigured reference temperature, but may perform the operation of changing the preconfigured reference temperature only when the voltage periodically measured for a preconfigured time continues to reach the control-requiring value. Through this identification operation, it is possible to prevent unnecessary performance control from being performed due to a change of the preconfigured reference temperature according to a temporary voltage change.

In an embodiment, the processor may determine whether the measured voltage falls within a first range and a second range which is divided and configured in advance. The first range may be a range including a lower voltage than the second range. Since the risk of low-temperature burns may be greater in the case that the measured voltage falls within the second range than the case that the measured voltage falls within the first range, a more aggressive performance limitation may be required in the case that the measured voltage falls within the second range than the case that the measured voltage falls within the first range. The processor may change the preconfigured reference temperature to a first reference temperature in case that the measured voltage falls within the first range, and change the preconfigured reference temperature to a second reference temperature in case that the measured voltage falls within the second range. The second reference temperature may be lower than the first reference temperature. In case that the preconfigured reference temperature is changed to the second reference temperature, the performance control operation may be performed at a relatively lower temperature than the case in which the preconfigured reference temperature is change to the first reference temperature.

In an embodiment, as shown in FIG. 13, it is also possible to further subdivide the range. For example, the range may be divided into three parts. The processor may determine whether the voltage measured through the electrode falls within the first range (e.g., the first range 810A in FIG. 8A) (1330). In case that the measured voltage falls within the first range (1331-1), the preconfigured reference temperature may be changed to the first reference temperature (1331). In case that the measured voltage does not fall within the first range (1330-2), the processor may identify whether the measured voltage falls within the second range (e.g., the second range 810B in FIG. 8A) (1340). In case that the measured voltage falls within the second range (1340-1), the preconfigured reference temperature may be changed to the second reference temperature (1341). In case that the measured voltage does not fall within the second range (1340-2), the processor may identify whether the measured voltage falls within the third range (e.g., the third range 810C in FIG. 8A) (1350). In case that the measured voltage falls within the third range (1350-1), the preconfigured reference temperature may be changed to the third reference temperature (1351).

According to various embodiments, the third reference temperature may be lower than the second reference temperature, and the second reference temperature may be lower than the first reference temperature. In case that the third reference temperature is configured, the performance control operation may be performed at a lower temperature than the case that the first reference temperature or the second reference temperature is configured. In case that the preconfigured temperature is the second reference temperature, the performance limitation operation for heat generation control may be performed at a lower temperature than the case that the preconfigured temperature is the first reference temperature. In case that the preconfigured temperature is the third reference temperature, the performance limitation operation for heat generation control may be performed at a lower temperature than the case that the preconfigured temperature is the second reference temperature.

FIG. 14 shows tables illustrating one of performance control methods of an electronic device according to various embodiments of the disclosure.

According to various embodiments, the change of the preconfigured reference temperature at which the performance control of the electronic device starts may be performed by identifying a voltage that is an electrical value measured through the electrode. In addition, a temporal factor may be further considered. In an embodiment, the measured voltage falls within the first range (e.g., 1330-1 of FIG. 13), the preconfigured reference temperature is changed to the first reference temperature T1 (e.g., 1331 in FIG. 13), and then a voltage may be continuously measured at predetermined time intervals. In case that the measured voltage continues to fall within the first range for a predetermined time, even if the voltage falls within the first range, the preconfigured reference temperature may be changed to the second reference temperature T2 or the third reference temperature T3 lower than the first reference temperature T1.

Hereinafter, a specific example thereof will be described with reference to FIG. 14. In case that the measured voltage falls within the first range, the preconfigured reference temperature may be changed to the first reference temperature T1 (e.g., 1331 of FIG. 13). In case that the measured voltage continues to fall within the first range even after a specific time period (e.g., 2 hours) has elapsed, the preconfigured reference temperature may be changed to the second reference temperature T2. In case that the measured voltage continues to fall within the first range even after a specific time period (e.g., 4 hours) has elapsed, the preconfigured reference temperature may be changed to the third reference temperature T3. In case that the measured voltage falls within the second range, the preconfigured reference temperature may be changed to the second reference temperature T2 (e.g., 1341 of FIG. 13). In case that the measured voltage continues to fall within the second range even after a specific time period (e.g., 2 hours) has elapsed, the preconfigured reference temperature may be changed to the third reference temperature T3.

In an embodiment, the preconfigured reference temperature may be changed in consideration of the measured voltage and the time factor together. For example, in case that the measured voltage falls within the first range, the preconfigured reference temperature is changed to the first reference temperature T1, and the voltage measured in a state in which a specific time (e.g., 2 hours) has elapsed falls within the second range, the preconfigured reference temperature may be changed to the third reference temperature T3.

Here, the first reference temperature T1 may be lower than a preconfigured reference temperature R that is basically configured. The second reference temperature T2 may be lower than the first reference temperature T1. The third reference temperature T3 may be lower than the second reference temperature T2. For example, when the initial value R of the preconfigured reference temperature is 40 degrees, the first reference temperature T1 may be 39 degrees, the second reference temperature T2 may be 38 degrees, and the third reference temperature T3 may be 36 degrees.

Figure 15:
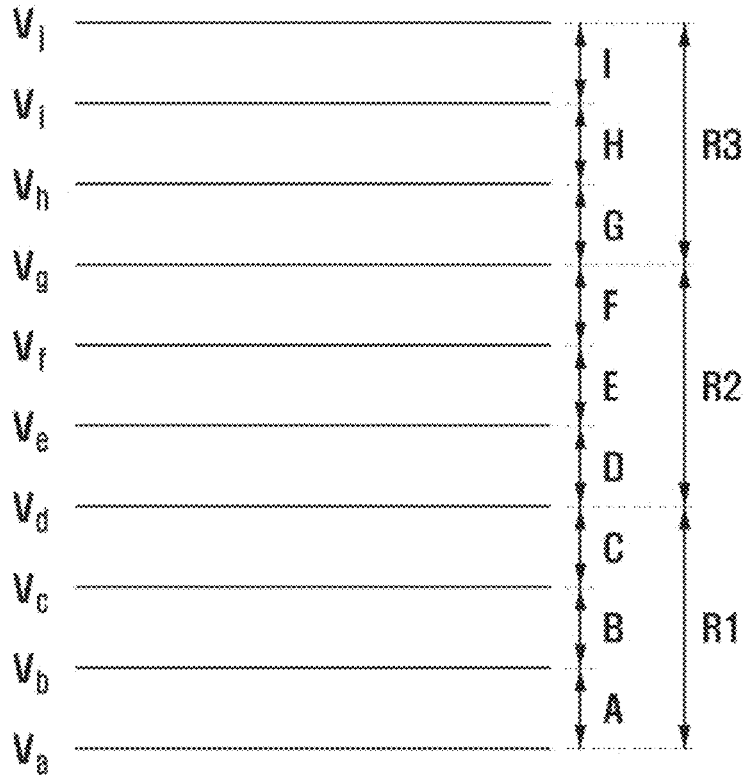
FIG. 15 is a view illustrating one of performance control methods of an electronic device according to various embodiments of the disclosure.

FIG. 15 is a view illustrating one of performance control methods of an electronic device according to various embodiments of the disclosure.

According to various embodiments, the performance control of the electronic device may change a temperature (the preconfigured reference temperature) at which the performance control starts according to the voltage measured through the electrode, and concurrently vary the degree of performance control.

For example, in case that there is an increase in foreign substances or moisture between the electronic device and the user's skin as shown in FIG. 15, the voltage measured at the electrode may also continuous to rise. Referring to FIG. 15, the voltage may increase from $V_a$, $V_b$, $V_c$, $V_d$, $V_e$, $V_f$, $V_g$, $V_h$, $V_i$, $V_j$.

According to various embodiments, in case that the voltage measured at the electrode falls within a period R1 of $V_a$, $V_b$, $V_c$, $V_d$, the processor may change the temperature at which performance control of the electronic device starts to the first reference temperature. In addition, in case that the measured voltage falls within a period A of $V_a$ to $V_b$, the performance of the electronic device may be limited to level A. In case that the measured voltage falls within a period B of $V_b$ to $V_c$, the performance of the electronic device may be limited to level B. In case that the measured voltage falls within a period C of $V_c$ to $V_d$, the performance of the electronic device may be limited to level C. Level B may include a more robust performance limitation operation than level A. Level C may include a more robust performance limitation operation than level B.

According to various embodiments, in case that the voltage measured at the electrode falls within a period R2 of $V_d$, $V_e$, $V_f$, $V_g$, the processor may change the temperature at which performance control of the electronic device starts to the second reference temperature. In addition, in case that the measured voltage falls within a period D of $V_d$ to $V_e$, the performance of the electronic device may be limited to level D. In case that the measured voltage falls within a period E of $V_e$ to $V_f$, the performance of the electronic device may be limited to level E. In case that the measured voltage falls within a period F of $V_f$ to $V_g$, the performance of the electronic device may be limited to level F. Level E may include a more robust performance limitation operation than level D. Level F may include a more robust performance limitation operation than level E.

According to various embodiments, in case that the voltage measured at the electrode falls within a period R3 of $V_g$, $V_h$, $V_i$, $V_j$, the processor may change the temperature at which performance control of the electronic device starts to the third reference temperature. In addition, in case that the measured voltage falls within a period G of $V_g$ to $V_h$, the performance of the electronic device may be limited to level G. In case that the measured voltage falls within a period H of $V_h$ to $V_i$, the performance of the electronic device may be limited to level H. In case that the measured voltage falls within a period I of $V_i$ to $V_j$, the performance of the electronic device may be limited to level I. Level H may include a more robust performance limitation operation than level G. Level I may include a more robust performance limitation operation than level H.

In an embodiment, the second reference temperature may be lower than the first reference temperature, and the third reference temperature may be lower than the second reference temperature. Since the third reference temperature has the lowest temperature at which the performance control starts, the performance limitation operation may be more actively performed compared to the first reference temperature and the second reference temperature. Since a voltage for changing to the third reference temperature is high, it can be estimated that moisture between the electronic device and the user's skin has increased at the corresponding voltage.

According to various embodiments, the processor may identify temperature information including a temperature of the electronic device by concurrently/sequentially identifying a signal (voltage or current) measured by the temperature sensor while checking the voltage measured through the electrode. Here, the temperature of the electronic device may include a temperature (hereinafter referred to as "temperature") inside the electronic device. The processor may perform the performance limitation operation based on the temperature identified through the temperature sensor. The processor may continuously increase the performance limitation level according to the identified temperature, and may change the performance limitation level based on reaching a specific temperature. Here, the increase in the performance limitation level may indicate controlling a direction in which heat of an electronic component is reduced or power consumption of the electronic component is reduced.

For example, in case that the voltage measured through the electrode falls within the section R1 of FIG. 15, the reference temperature at which temperature control is started may be changed to the first reference temperature, and the temperature may be identified through the temperature sensor. The processor may increase the performance limitation level at a higher identified temperature. It is also possible to use a preconfigured control temperature. The preconfigured control temperature may include, for example, a first control temperature, a second control temperature, and a third control temperature. The second control temperature may be higher than the first control temperature and lower than the third control temperature. In case that the identified temperature reaches the first control temperature, the performance limitation level may be changed to a first level. In case that the identified temperature reaches the second control temperature, the performance limitation level may be changed to a second level. In case that the identified temperature reaches the third control temperature, the performance limitation level may be changed to a third level. Here, the performance limitation of the second level may indicate a performance limitation that is stronger than the performance limitation of the first level, and the performance limitation of the third stage may indicate a performance limitation that is stronger than the performance limitation of the second level.

For example, in case that the voltage measured through the electrode falls within the section R2 of FIG. 15, the reference temperature at which temperature control is started may be changed to the second reference temperature, and the temperature may be identified through the temperature sensor. The processor may increase the performance limitation level when the identified temperature is high. It is also possible to use a preconfigured control temperature. The preconfigured control temperature may include, for example, a fourth control temperature, a fifth control temperature, and a sixth control temperature. The fifth control temperature may be higher than the fourth control temperature and lower than the sixth control temperature. In case that the identified temperature reaches the fourth control temperature, the performance limitation level may be changed to a fourth level. In case that the identified temperature reaches the fifth control temperature, the performance limitation level may be changed to a fifth level. In case that the identified temperature reaches the sixth control temperature, the performance limitation level may be changed to a sixth level. Here, the performance limitation of the fifth level may indicate a performance limitation that is stronger than the performance limitation of the fourth level, and the performance limitation of the sixth stage may indicate a performance limitation that is stronger than the performance limitation of the fifth level.

For example, in case that the voltage measured through the electrode falls within the section R3 of FIG. 15, the reference temperature at which temperature control is started may be changed to the third reference temperature, and the temperature may be identified through the temperature sensor. The processor may increase the performance limitation level at a higher identified temperature. It is also possible to use a preconfigured control temperature. The preconfigured control temperature may include, for example, a seventh control temperature, an eighth control temperature, and a ninth control temperature. The eighth control temperature may be higher than the seventh control temperature and lower than the ninth control temperature. In case that the identified temperature reaches the seventh control temperature, the performance limitation level may be changed to a seventh level. In case that the identified temperature reaches the eighth control temperature, the performance limitation level may be changed to an eighth level. In case that the identified temperature reaches the ninth control temperature, the performance limitation level may be changed to a ninth level. Here, the performance limitation of the eighth level may indicate a performance limitation that is stronger than the performance limitation of the seventh level, and the performance limitation of the ninth stage may indicate a performance limitation that is stronger than the performance limitation of the eighth level.

The strong performance limitation described above may indicate performance control in a direction in which heat of the electronic device is reduced or a current consumed in an electronic component included in the electronic device is reduced.

As described above, the operation of changing the preconfigured reference temperature, which is the temperature at which the performance control starts, may also be applied to FIG. 9, FIG. 10, FIG. 11, FIG. 12A, and FIG. 12B described above.

In relation to FIG. 9, the processor may change the preconfigured reference temperature to be lowered as the voltage measured through the electrode continues within a specific range for a specific period of time. For example, even in case that the measured voltage falls within the first range and the preconfigured reference temperature is changed to the first temperature, if the measured voltage continues to fall within the first range, the preconfigured reference temperature may be changed to the second temperature. Since the second temperature is lower than the first temperature, the processor may control the performance of the electronic device from a lower temperature.

Figure 10:
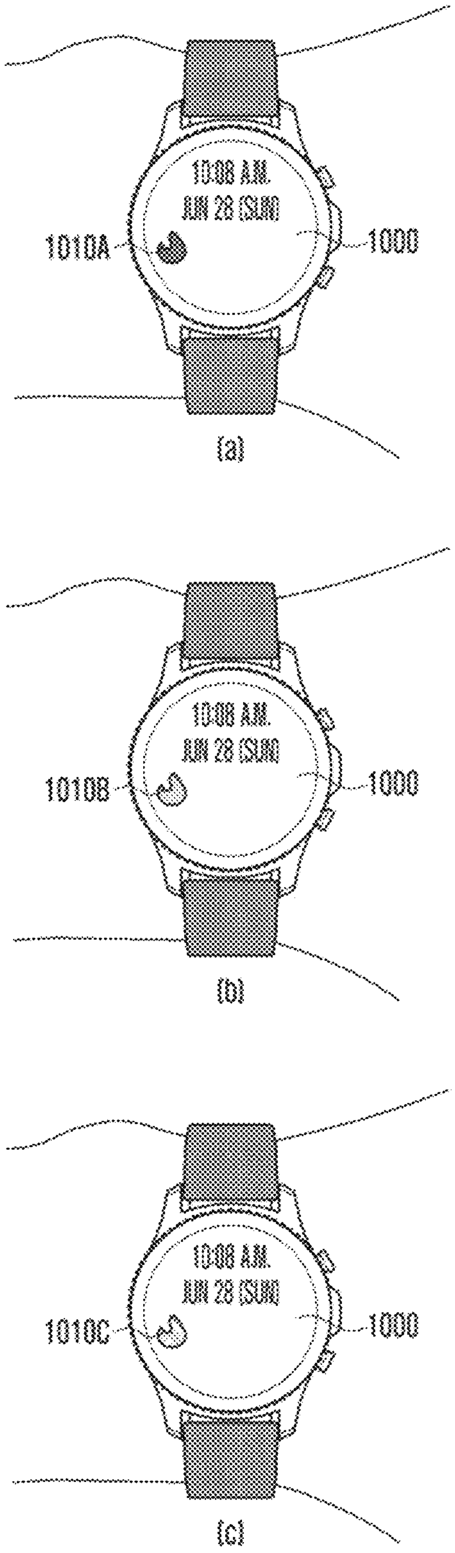
FIG. 10 is a view illustrating an embodiment of displaying an alarm on a display of an electronic device according to various embodiments of the disclosure.

In relation to FIG. 10, the processor may display a display interface (e.g., the display interface 1010A, the display interface 1010B, and the display interface 1010C in FIG. 10) on the display to identify a state in which the preconfigured reference temperature is changed. By changing the shape, size, and/or color of the display interface according to the degree of change in the reference temperature, the user may identify how much the preconfigured reference temperature is changed.

In relation to FIG. 11, in case that the voltage measured through the electrode does not fall below the control-requiring value for a preconfigured time even if the preconfigured reference temperature is changed, the processor may display a warning interface (e.g., the warning interface 1100 in FIG. 11). For example, as shown in FIG. 11, by displaying the warning interface such as "Please clean the rear surface and wear the device again", it is possible to induce the user to take an appropriate action.

In relation to FIG. 12B, the processor may display an identification interface (e.g., the identification interface 1200 in FIG. 12B) on the display before changing the preconfigured reference temperature. The processor may display the identification interface on the display in case that the voltage measured through the electrode satisfies the control-requiring value. The identification interface may be an interface for acquiring a user's consent for the preconfigured reference temperature. In an embodiment, the processor may store the number of times the user selects a refusal to perform changing the preconfigured temperature. In case that the number of times the user rejects to perform changing the preconfigured temperature exceeds a preconfigured number of times, the control-requiring value may be readjusted.

An electronic device (e.g., the electronic device 200 in FIG. 2) according to various embodiments disclosed herein may include a main body (e.g., the housing 210 and the front plate 201 in FIG. 2, and the rear plate 207 in FIG. 3), a display (e.g., the display 220 in FIG. 4), an electrode (e.g., any of the electrode 301 and electrode 302 in FIG. 5B) positioned in the main body to be in contact with a user's body, and a processor (e.g., the processor 120 in FIG. 1) operatively connected to the display and the electrode, wherein the processor may identify an electrical value measured through the electrode, determine whether to control the performance of the electronic device by comparing the identified electrical value with a preconfigured control-requiring value, identify whether the identified electrical value falls within a first range and a second range which are classified and configured in advance, based on the identified electrical value falling within the first range, control the performance of the electronic device to a first level, and based on the identified electrical value falling within the second range, and control the performance of the electronic device to a second level, and the performance of the electronic device controlled to the second level may be relatively lower than the performance of the electronic device controlled to the first level.

The processor may detect wearing of the electronic device to configure an electrical value measured through the electrode immediately after being worn as a reference value, and may configure the control-requiring value based on the reference value.

The reference value may be configured with an electrical value measured in case that the electronic device is worn in a fully charged state.

The first level and second level performance control may include at least one of an operation of controlling an operation clock of the processor, an operation of controlling an output of a communication module (e.g., the communication module 190 in FIG. 1) included in the electronic device, and an operation of controlling a measurement period of a sensor module (e.g., the sensor module 176 in FIG. 1) included in the electronic device.

The electrical value may include a current value and a voltage value for identifying a change in contact resistance between the electrode and the user's skin due to a foreign substance introduced between the electrode and the user's skin.

After controlling the performance of the electronic device to the first level or the second level, the processor may re-identify the electrical value measured through the electrode, compare the re-identified electrical value and the control-requiring value for a preconfigured time, and display a warning interface on the display based on the comparison.

After controlling the performance of the electronic device to the first level, the processor may re-identify the electrical value measured through the electrode, compare the re-identified electrical value and the control-requiring value for a preconfigured time, and control the performance of the electronic device to the second level, based on the comparison.

The processor may display, on the display, an identification interface (e.g., the identification interface 1200 in FIG. 12B) for identifying whether the performance control is performed and identify a comparison result between the identified electrical value and the preconfigured control-requiring value and an input through the identification interface to determine whether to control the performance of the electronic device.

The processor may reconfigure the control-requiring value based on the rejection of the performance control by an input through the identification interface more than a preconfigured number of times.

An electronic device (e.g., the electronic device 200 in FIG. 2) according to various embodiments disclosed herein may include a main body (e.g., the housing 210 and the front plate 201 in FIG. 2, and the rear plate 207 in FIG. 3), a display (e.g., the display 220 in FIG. 4), a temperature sensor for measuring an internal temperature of the electronic device, an electrode (e.g., any of the electrode 301 and 302 in FIG. 5B) positioned in the main body to be in contact with a user's body, and a processor (e.g., the processor 120 in FIG. 1) operatively connected to the display, the temperature sensor, and the electrode, wherein the processor determines whether to control performance of the electronic device based on a temperature of the electronic device measured by the temperature sensor reaching a preconfigured reference temperature, identifies an electrical value measured through the electrode, compares the identified electrical value and a preconfigured control-requiring value, and changes the preconfigured reference temperature to a low temperature based on the comparison.

The processor may identify an electrical value measured through the electrode based on the temperature of the electronic device measured through the temperature sensor reaching a preconfigured monitoring temperature.

The processor may identify whether the identified electrical value falls within a first range and a second range which are classified and configured in advance, change the preconfigured reference temperature to a first reference temperature based on the identified electrical value falling within the first range, and change the preconfigured reference temperature to a second reference temperature based on the identified electrical value falling within the second range, and the second reference temperature may be a temperature lower than the first reference temperature.

The processor may detect wearing of the electronic device to configure an electrical value measured through the electrode immediately after being worn as a reference value, and may configure the control-requiring value based on the reference value.

The reference value may be configured with an electrical value measured in case that the electronic device is worn in a fully charged state.

The performance control of the electronic device may include at least one of an operation of controlling an operation clock of the processor, an operation of controlling an output of a communication module included in the electronic device, and an operation of controlling a measurement period of a sensor module included in the electronic device.

The electrical value may include a current value and a voltage value for identifying a change in contact resistance between the electrode and the user's skin due to a foreign substance introduced between the electrode and the user's skin.

After changing the preconfigured reference temperature, the processor may re-identify the electrical value measured through the electrode, compare the re-identified electrical value and the control-requiring value for a preconfigured time, and display a warning interface (e.g., the warning interface 1100 in FIG. 11) on the display, based on the comparison.

After changing the preconfigured reference temperature to a first reference temperature, the processor may re-identify the electrical value measured through the electrode, compare the re-identified electrical value and the control-requiring value for a preconfigured time, and change the preconfigured reference temperature to a second reference temperature.

The processor may display, on the display, an identification interface (e.g., the identification interface 1200 in FIG. 12B) for identifying whether the preconfigured temperature is changed and identify a comparison result between the identified electrical value and the preconfigured control-requiring value and an input through the identification interface to determine whether the preconfigured reference temperature is changed.

The processor may reconfigure the control-requiring value based on the rejection of the change of the preconfigured temperature by an input through the identification interface more than a preconfigured number of times.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. The electronic devices according to embodiments of the disclosure are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., module or program) of the above-described components may include a singular or a plurality of entities, and some of the plurality of entities may be separately disposed in any other component. According to various embodiments, one or more components or operations among the above-described components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly, or heuristically, or one or more of the operations may be executed in a different order or omitted, or one or more other operations may be added.

What is claimed is:

1. An electronic device comprising:

a main body;

a display;

an electrode positioned in the main body to be in contact with a body of a user; and a processor operatively connected to the display and the electrode, wherein the processor is configured to:

configure, based on detecting that the electronic device is worn on the body of the user, a first electrical value, measured through the electrode after the electronic device is detected as worn on the body of the user, as a reference value;

configure a control-requiring value based on the reference value;

identify a second electrical value measured through the electrode, determine whether to control a performance of the electronic device by comparing the second electrical value and the control-requiring value, identify whether the second electrical value is within at least one of a first range and a second range which are classified and configured in advance, based on identifying that the second electrical value is within the first range, control the performance of the electronic device to a first level, and based on identifying that the second electrical value is within the second range, control the performance of the electronic device to a second level, and wherein the performance of the electronic device controlled to the second level is relatively lower than the performance of the electronic device controlled to the first level.

2. The electronic device of claim 1, wherein the reference value is obtained further based on determining that the electronic device is worn on the body of the user and is in a fully charged state.

3. The electronic device of claim 1, wherein the performance control at both the first level and the second level comprises at least one of:

controlling an operation clock of the processor, controlling an output of a communication module included in the electronic device, and controlling a measurement period of a sensor module included in the electronic device.

4. The electronic device of claim 1, wherein the second electrical value comprises a current value and a voltage value for identifying a change in a contact resistance between the electrode and the body of the user due to a foreign substance introduced between the electrode and the body of the user.

5. The electronic device of claim 1, wherein the processor is further configured to:

re-identify, as a re-identified second electrical value, the second electrical value measured through the electrode after controlling the performance of the electronic device to the first level or the second level;

compare the re-identified second electrical value and the control-requiring value for a preconfigured time; and control, based on a result of comparing the re-identified second electrical value and the control-requiring value for the preconfigured time, the display to display a warning interface.

6. The electronic device of claim 1, wherein the processor is further configured to:

re-identify, as a re-identified second electrical value, the second electrical value measured through the electrode after controlling the performance of the electronic device to the first level;

compare the re-identified second electrical value and the control-requiring value for a preconfigured time; and control, based on a result of comparing the re-identified second electrical value and the control-requiring value for the preconfigured time, the performance of the electronic device to the second level.

7. The electronic device of claim 1, wherein the processor is further configured to:

control the display to display an identification interface indicating whether the performance is controlled; and determine whether to control the performance of the electronic device based on identifying a comparison result between the second electrical value and the control-requiring value, and an input through the identification interface.

8. The electronic device of claim 7, wherein the processor is further configured to reconfigure the control-requiring value based on a rejection of a control of the performance being determined to be input through the identification interface more than a preconfigured number of times.

9. The electronic device of claim 1, wherein the processor is further configured to configured to configure, based on detecting that the electronic device is worn on the body of the user, the first electrical value, measured through the electrode immediately after the electronic device is detected as worn on the body of the user, as the reference value by setting the first electrical value as indicative of a normal state of the body of the user.

10. The electronic device of claim 9, wherein the processor is further configured to configured to configure the control-requiring value based on the reference value by setting the control-requiring value as a percentage value greater than the reference value, the control-requiring value indicating that the performance of the electronic device is to be controlled to be lowered to one of the first level and the second level based on determining that the second electrical value is any of at the percentage value greater than the reference value and greater than the percentage value greater than the reference value.

11. A heating control method of an electronic device, the method comprising:

determining, by a processor of the electronic device, whether to control a performance of the electronic device based on a temperature of the electronic device measured by a temperature sensor of the electronic device reaching a preconfigured reference temperature;

configuring, by the processor and based on detecting that the electronic device is worn on a body of a user, a first electrical value, measured through an electrode of the electronic device after the electronic device is detected as worn on the body of the user, as a reference value;

configuring, by the processor, a control-requiring value based on the reference value;

identifying, by the processor, a second electrical value measured through the electrode included in the electronic device;

comparing, by the processor, the second electrical value and the control-requiring value; and changing, by the processor, the preconfigured reference temperature to a lower temperature, based on a result of the comparing.

12. The method of claim 11, wherein the identifying the second electrical value comprises, based on determining the temperature of the electronic device measured through the temperature sensor as reaching a preconfigured monitoring temperature, identifying the second electrical value as a measurement through the electrode.

13. The method of claim 11, wherein the changing the preconfigured reference temperature comprises:

identifying whether the second electrical value is within at least one of a first range and a second range which are classified and configured in advance;

based on identifying that the second electrical value is within the first range, changing the preconfigured reference temperature to a first reference temperature; and based on identifying that the second electrical value is within the second range, changing the preconfigured reference temperature to a second reference temperature, and wherein the second reference temperature is lower than the first reference temperature.

14. The method of claim 11, further comprising:

identifying, by the processor, a re-identified second electrical value by re-identifying the second electrical value measured through the electrode after changing the preconfigured reference temperature to a first reference temperature;

comparing, by the processor, the re-identified second electrical value and the control-requiring value for a preconfigured time; and changing, by the processor, the preconfigured reference temperature to a second reference temperature.

15. The method of claim 11, further comprising:

controlling, by the processor, a display to display an identification interface indicating whether the preconfigured reference temperature is changed; and determining whether the preconfigured reference temperature is to be changed based on identifying a comparison result between the second electrical value and the control-requiring value, and an input through the identification interface.

16. The method of claim 11, further comprising, by the processor:

determining whether to control the performance of the electronic device by comparing the second electrical value and the control-requiring value;

identifying whether the second electrical value is within at least one of a first range and a second range which are classified and configured in advance;

based on identifying that the second electrical value is within the second range, controlling the performance of the electronic device to a second level, the performance of the electronic device controlled to the second level is relatively lower than the performance of the electronic device controlled to a first level;

detecting whether the electronic device is worn by the user;

based on detecting the electronic device is worn, obtaining the reference value based on a measurement through the electrode and determining that the electronic device is worn and is in a fully charged state; and configuring the control-requiring value based on the reference value, wherein the electronic device comprises a main body, a display, the processor operatively connected to the display and the electrode, and the electrode is positioned in the main body to be in contact with the body of the user.

17. The method of claim 11, further comprising, by the processor:

determining whether to control the performance of the electronic device by comparing the second electrical value and the control-requiring value;

identifying whether the second electrical value is within at least one of a first range and a second range which are classified and configured in advance;

based on identifying that the second electrical value is within the second range, controlling the performance of the electronic device to a second level, the performance of the electronic device controlled to the second level is relatively lower than the performance of the electronic device controlled to a first level;

controlling a display to display an identification interface indicating whether the performance is controlled;

determining whether to control the performance of the electronic device based on identifying a comparison result between the second electrical value and the control-requiring value, and an input through the identification interface; and reconfiguring the control-requiring value based on a rejection of a control of the performance being determined to be input through the identification interface more than a preconfigured number of times, wherein the electronic device comprises a main body, the display, the processor operatively connected to the display and the electrode, and the electrode is positioned in the main body to be in contact with the body of the user.

18. An electronic device comprising:

a main body;

a display;

an electrode positioned in the main body to be in contact with a body of a user; and a processor operatively connected to the display and the electrode, wherein the processor is configured to:

identify an electrical value measured through the electrode, determine whether to control a performance of the electronic device by comparing the electrical value and a preconfigured control-requiring value, identify whether the electrical value is within at least one of a first range and a second range which are classified and configured in advance, based on identifying that the electrical value is within the first range, control the performance of the electronic device to a first level, and based on identifying that the electrical value is within the second range, control the performance of the electronic device to a second level, wherein the performance of the electronic device controlled to the second level is relatively lower than the performance of the electronic device controlled to the first level, and wherein the processor is further configured to implement at least one of (a) and (b) of which:

(a) comprises:

detecting whether the electronic device is worn by the user;

based on detecting the electronic device is worn, obtaining a reference value based on a measurement through the electrode and determining that the electronic device is worn and is in a fully charged state; and configuring the preconfigured control-requiring value based on the reference value, and (b) comprises:

controlling the display to display an identification interface indicating whether the performance is controlled;

determining whether to control the performance of the electronic device based on identifying a comparison result between the electrical value and the preconfigured control-requiring value, and an input through the identification interface; and reconfiguring the preconfigured control-requiring value based on a rejection of a control of the performance being determined to be input through the identification interface more than a preconfigured number of times.

* * * * *